(12) United States Patent
Nagami et al.

(10) Patent No.: US 8,856,264 B2
(45) Date of Patent: Oct. 7, 2014

(54) COMPUTER SYSTEM AND MANAGEMENT SYSTEM THEREFOR

(75) Inventors: Akihisa Nagami, Yokohama (JP); Yasunori Kaneda, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 145 days.

(21) Appl. No.: 13/318,698

(22) PCT Filed: Oct. 28, 2011

(86) PCT No.: PCT/JP2011/006043
§ 371 (c)(1),
(2), (4) Date: Nov. 3, 2011

(87) PCT Pub. No.: WO2013/061380
PCT Pub. Date: May 2, 2013

(65) Prior Publication Data
US 2013/0110966 A1    May 2, 2013

(51) Int. Cl.
*G06F 15/167* (2006.01)
*G06F 15/173* (2006.01)
*H04L 12/26* (2006.01)
*G06F 3/06* (2006.01)
*H04L 12/851* (2013.01)
*H04L 12/801* (2013.01)
*H04L 12/803* (2013.01)

(52) U.S. Cl.
CPC .......... *G06F 3/0613* (2013.01); *H04L 43/0882* (2013.01); *H04L 47/24* (2013.01); *G06F 3/0631* (2013.01); *G06F 3/0635* (2013.01); *H04L 47/17* (2013.01); *H04L 43/0876* (2013.01); *H04L 43/0894* (2013.01); *H04L 47/125* (2013.01); *H04L 43/04* (2013.01); *G06F 3/0685* (2013.01); *H04L 43/08* (2013.01)

USPC ........................... 709/214; 709/223; 709/224

(58) Field of Classification Search
CPC . H04L 43/0876; H04L 43/0882; H04L 43/08; H04L 43/04; H04L 47/17; H04L 47/24
USPC .................................. 709/240, 214, 223, 224
See application file for complete search history.

(56) References Cited

U.S. PATENT DOCUMENTS

| | | | |
|---|---|---|---|
| 6,845,344 B1 * | 1/2005 | Lally et al. ................... | 702/186 |
| 7,093,011 B2 * | 8/2006 | Hirata et al. ................. | 709/223 |
| 7,688,733 B1 * | 3/2010 | Mirza .......................... | 370/235 |
| 7,930,448 B2 * | 4/2011 | Chaitanya et al. .............. | 710/38 |

(Continued)

FOREIGN PATENT DOCUMENTS

WO    2011092738 A1    8/2011

*Primary Examiner* — Kevin Bates
*Assistant Examiner* — Emad Siddiqi
(74) *Attorney, Agent, or Firm* — Volpe and Koenig, P.C.

(57) ABSTRACT

A computer system in an embodiment of this invention comprises a plurality of host computers in which a plurality of host programs are executed, a plurality of storage systems including a plurality of volumes provided to the plurality of host programs, and a management system. Each of the plurality of host programs is located at a port of a host computer. Each of the plurality of volumes is located at a port of a storage system. The management system obtains information on bandwidths of a plurality of paths included in a data communication network among the plurality of storage systems and the plurality of host computers. The management system determines priority levels of individual candidate ports for new location of at least either one of a first host program and a first volume with reference to the information.

16 Claims, 34 Drawing Sheets

DESTINATION RECOMMENDATION LEVEL TABLE (ST1, PT1)    180

| SINGLE STORAGE POOL ID | STORAGE SYSTEM ID | DESTINATION PORT ID | DESTINATION RECOMMENDATION LEVEL |
|---|---|---|---|
| SPool1 | ST1 | PT2 | ★★★★★ |
| | | PT3 | ★★★★★ |
| | | PT4 | ★★★★★ |
| | ST2 | PT1 | ★★★★★ |
| | | PT2 | ★★★★ |
| | | PT3 | ★★★ |
| | | PT4 | ★★ |
| | ST3 | PT1 | ★ |
| | | PT2 | ★ |
| | | PT3 | ★ |
| | | PT4 | ★ |

1801 / 1802 / 1803 / 1804

(56) References Cited

U.S. PATENT DOCUMENTS

| | | | |
|---|---|---|---|
| 7,987,256 B2 * | 7/2011 | Hirata et al. | 709/223 |
| 8,161,256 B2 * | 4/2012 | Hara et al. | 711/162 |
| 2004/0024870 A1 | 2/2004 | Hirata et al. | |
| 2006/0074957 A1 * | 4/2006 | Yamamoto et al. | 707/101 |
| 2006/0248304 A1 * | 11/2006 | Hosouchi et al. | 711/165 |
| 2009/0172666 A1 | 7/2009 | Yahalom et al. | |
| 2011/0082950 A1 * | 4/2011 | Mine et al. | 710/36 |

* cited by examiner

Fig. 8

STORAGE SYSTEM MANAGEMENT TABLE (100)

| STORAGE SYSTEM ID (1001) | MANAGEMENT PORT IP ADDRESS (1002) |
|---|---|
| ST1 | 192.168.1.101 |
| ST2 | 192.168.1.102 |
| ST3 | 192.168.1.103 |
| ST4 | 192.168.1.104 |
| . . . | . . . |

Fig. 9

CONNECTION APPARATUS MANAGEMENT TABLE (110)

| CONNECTION APPARATUS ID (1101) | MANAGEMENT PORT IP ADDRESS (1102) |
|---|---|
| SW1 | 192.168.1.201 |
| SW2 | 192.168.1.202 |
| SW3 | 192.168.1.203 |
| SW4 | 192.168.1.204 |
| . . . | . . . |

Fig. 10

TRANSFER RANGE MANAGEMENT TABLE (130)

| SINGLE STORAGE POOL ID (1301) | STORAGE SYSTEM ID (1302) | PORT ID (1303) |
|---|---|---|
| SPool1 | ST1 | PT1 |
| | | PT2 |
| | | PT3 |
| | | PT4 |
| | ST2 | PT1 |
| | | PT2 |
| | | PT3 |
| | | PT4 |
| | ST3 | PT1 |
| | | PT2 |
| | | PT3 |
| | | PT4 |
| SPool2 | ST4 | PT1 |
| | | PT2 |
| | | PT3 |
| | | PT4 |
| | ST5 | PT1 |
| | | PT2 |
| | | PT3 |
| . . . | . . . | . . . |

Fig. 11

| THRESHOLD FOR MINIMUM BANDWIDTH | THRESHOLD FOR NUMBER OF TRANSIT CONNECTION APPARATUSES | THRESHOLD FOR AVERAGE BANDWIDTH USAGE RATE OF LOWEST-BANDWIDTH PATH | THRESHOLD FOR PEAK BANDWIDTH USAGE RATE OF LOWEST-BANDWIDTH PATH | THRESHOLD FOR LATENCY |
|---|---|---|---|---|
| 1401 | 1402 | 1403 | 1404 | 1405 |
| 8Gbps | 2 | 50% | 80% | 3ms |

STORAGE TOPOLOGY MANAGEMENT THRESHOLD TABLE 140

Fig. 12

VOLUME MANAGEMENT TABLE 150

| VOLUME NO. 1501 | CAPACITY 1502 | AMOUNT OF USAGE 1503 | VOLUME TYPE 1504 | STORAGE SYSTEM ID 1505 | VOLUME ID 1506 | PORT ID 1507 |
|---|---|---|---|---|---|---|
| 1 | 10GB | 5GB | NORMAL | ST1 | Vol1 | PT1 |
| 2 | 10GB | 8GB | NORMAL | ST1 | Vol2 | PT1 |
| 3 | 10GB | 3GB | NORMAL | ST2 | Vol1 | PT1 |
| 4 | 40GB | 3GB | THIN PROVISIONING | ST1 | Vol3 | PT1 |
| 5 | 40GB | 4GB | THIN PROVISIONING | ST2 | Vol2 | PT1 |
| 6 | 10GB | 1GB | THIN PROVISIONING | ST1 | Vol4 | PT1 |
| 7 | 10GB | 1GB | POOL | ST1 | Vol1 | PT2 |
| 8 | 10GB | 1GB | POOL | ST1 | Vol2 | PT2 |
| 9 | 10GB | 2GB | POOL | ST2 | Vol1 | PT2 |
| 10 | 10GB | 2GB | POOL | ST2 | Vol2 | PT2 |

Fig. 14

THIN PROVISIONING POOL USAGE MANAGEMENT TABLE 170

| POOL ID 1701 | TOTAL CAPACITY 1702 | AMOUNT OF USAGE 1703 | STORAGE SYSTEM ID 1704 | CAPACITY 1705 | AMOUNT OF USAGE 1706 | CAPACITY THRESHOLD 1707 | IOPS 1708 | PERFORMANCE THRESHOLD 1709 |
|---|---|---|---|---|---|---|---|---|
| TPool1 | 100 GB | 15 GB | ST1 | 30 GB | 5 GB | 60% | 100 IOPS | 1000 IOPS |
| | | | ST2 | 70 GB | 10 GB | 50% | 2000 IOPS | 1500 IOPS |

Fig. 15

DESTINATION RECOMMENDATION LEVEL TABLE (ST1, PT1) — 180

| SINGLE STORAGE POOL ID (1801) | STORAGE SYSTEM ID (1802) | DESTINATION PORT ID (1803) | DESTINATION RECOMMENDATION LEVEL (1804) |
|---|---|---|---|
| SPool1 | ST1 | PT2 | ★★★★★ |
| | | PT3 | ★★★★★ |
| | | PT4 | ★★★★★ |
| | ST2 | PT1 | ★★★★★ |
| | | PT2 | ★★★★ |
| | | PT3 | ★★★ |
| | | PT4 | ★★ |
| | ST3 | PT1 | ★ |
| | | PT2 | ★ |
| | | PT3 | ★ |
| | | PT4 | ★ |

Fig. 17

STORAGE TOPOLOGY MANAGEMENT TABLE 200

| PORT ID 2001 | OPPOSED STORAGE SYSTEM ID 2002 | OPPOSED PORT ID 2003 | MINIMUM BANDWIDTH 2004 | NUMBER OF TRANSIT CONNECTION APPARATUSES 2005 | AVERAGE BANDWIDTH USAGE RATE OF LOWEST-BANDWIDTH PATH 2006 | PEAK BANDWIDTH USAGE RATE OF LOWEST-BANDWIDTH PATH 2007 | LATENCY 2008 |
|---|---|---|---|---|---|---|---|
| PT1 | ST1 | PT2 | 40Gbps | 1 | 10% | 50% | >1ms |
| | ST1 | PT3 | 40Gbps | 1 | 8% | 40% | >1ms |
| | ST1 | PT4 | 40Gbps | 1 | 3% | 25% | >1ms |
| | ST2 | PT1 | 40Gbps | 2 | 15% | 20% | >1ms |
| | ST2 | PT2 | 2Gbps | 2 | 80% | 90% | 2.4ms |
| | ST2 | PT3 | 2Gbps | 2 | 80% | 90% | 2.5ms |
| | ST2 | PT4 | 2Gbps | 2 | 80% | 90% | 2.0ms |
| | ST3 | PT1 | 20Gbps | 3 | 85% | 90% | 3.7ms |
| | ... | ... | ... | ... | ... | ... | ... |
| PT2 | ST1 | PT1 | 40Gbps | 1 | 15% | 55% | >1ms |
| | ST1 | PT3 | 40Gbps | 1 | 12% | 40% | >1ms |
| | ST1 | PT4 | 40Gbps | 1 | 10% | 25% | >1ms |
| | ST2 | PT1 | 40Gbps | 1 | 15% | 20% | >1ms |
| | ST3 | ... | ... | ... | ... | ... | ... |
| ... | ... | ... | ... | ... | ... | ... | ... |

Fig. 21

| \~400 CONNECTION APPARATUS MANAGEMENT TABLE | | | | | |
|---|---|---|---|---|---|
| \~4001 PORT ID | \~4002 OPPOSED APPARATUS ID | \~4003 CONNECTED PORT ID | \~4004 PHYSICAL BANDWIDTH | \~4005 AVERAGE AMOUNT OF TRAFFIC | \~4006 PEAK AMOUNT OF TRAFFIC |
| SPT1 | ST1 | PT1 | 40Gbps | 6Gbps | 22Gbps |
| SPT2 | ST1 | PT2 | 40Gbps | 4Gbps | 20Gbps |
| SPT3 | ST1 | PT3 | 40Gbps | 3.2Gbps | 16Gbps |
| SPT4 | ST1 | PT4 | 40Gbps | 1.2Gbps | 10Gbps |
| SPT5 | ST2 | PT1 | 40Gbps | 6Gbps | 8Gbps |
| SPT6 | SW2 | SPT1 | 2Gbps | 1.6Gbps | 1.8Gbps |
| SPT7 | SW3 | SPT1 | 8Gbps | 4.2Gbps | 6.0Gbps |
| SPT8 | SW4 | SPT1 | 8Gbps | 5.0Gbps | 6.4Gbps |

Fig. 26

VOLUME ACCESS CONDITION MANAGEMENT TABLE (220)

| PORT ID (2201) | VOLUME ID (2202) | AVERAGE BANDWIDTH USED IN VOLUME ACCESS (2203) | PEAK BANDWIDTH USED IN VOLUME ACCESS (2204) |
|---|---|---|---|
| PT1 | Vol1 | 300Mbps | 800Mbps |
|  | Vol2 | 200Mbps | 300Mbps |
|  | Vol3 | 50Mbps | 200Mbps |
|  | Vol4 | 100Mbbps | 150Mbps |
| PT2 | Vol1 | 30Mbps | 100Mbps |
|  | Vol2 | 500Mbps | 1Gbps |
| . . . | . . . | . . . | . . . |

Fig. 29

HOST MANAGEMENT TABLE 190

| HOST ID 1901 | MANAGEMENT PORT IP ADDRESS 1902 | AMOUNT OF MEMORY INSTALLED 1903 | AMOUNT OF MEMORY USAGE 1904 | NUMBER OF CPU CORES 1905 | CPU FREQUENCY 1906 | CPU USAGE RATE 1907 | PORT ID 1908 |
|---|---|---|---|---|---|---|---|
| HS1 | 192.168.1.11 | 16GB | 10GB | 4 | 2.0GHz | 20% | HBA1/HBA2 |
| HS2 | 192.168.1.12 | 16GB | 12GB | 4 | 2.0GHz | 60% | HBA1/HBA2 |
| HS3 | 192.168.1.13 | 32GB | 20GB | 8 | 2.3GHz | 30% | HBA1 |
| HS4 | 192.168.1.14 | 32GB | 28GB | 8 | 2.3GHz | 80% | HBA1 |
| ... | ... | ... | ... | ... | ... | ... | ... |

Fig. 30

| HOST TOPOLOGY MANAGEMENT THRESHOLD TABLE ~195 | | | | |
|---|---|---|---|---|
| ~1951 | ~1952 | ~1953 | ~1954 | ~1955 |
| THRESHOLD FOR MINIMUM BANDWIDTH | THRESHOLD FOR NUMBER OF TRANSIT CONNECTION APPARATUSES | THRESHOLD FOR AVERAGE BANDWIDTH USAGE RATE OF LOWEST-BANDWIDTH PATH | THRESHOLD FOR PEAK BANDWIDTH USAGE RATE OF LOWEST-BANDWIDTH PATH | THRESHOLD FOR LATENCY |
| 8Gbps | 2 | 50% | 80% | 3ms |

Fig. 32

HOST TOPOLOGY MANAGEMENT TABLE 230

| PORT ID (2301) | OPPOSED HOST COMPUTER ID (2302) | OPPOSED PORT ID (2303) | MINIMUM BANDWIDTH (2304) | NUMBER OF TRANSIT CONNECTION APPARATUSES (2305) | AVERAGE BANDWIDTH USAGE RATE OF LOWEST-BANDWIDTH PATH (2306) | PEAK BANDWIDTH USAGE RATE OF LOWEST-BANDWIDTH PATH (2307) | LATENCY (2308) |
|---|---|---|---|---|---|---|---|
| PT1 | HS1 | HBA1 | 2Gbps | 2 | 80% | 90% | 2.3ms |
| | HS1 | HBA2 | 2Gbps | 2 | 80% | 90% | 2.2ms |
| | HS2 | HBA1 | 2Gbps | 2 | 80% | 90% | 2.8ms |
| | HS2 | HBA2 | 2Gbps | 2 | 80% | 90% | 2.9ms |
| | HS3 | HBA1 | 40Gbps | 1 | 15% | 20% | <1ms |
| | HS4 | HBA1 | 40Gbps | 1 | 20% | 25% | <1ms |
| PT2 | HS1 | HBA1 | 2Gbps | 2 | 80% | 90% | 2.3ms |
| | HS1 | HBA2 | 2Gbps | 2 | 80% | 90% | 2.2ms |
| | HS2 | HBA1 | 2Gbps | 2 | 80% | 90% | 2.8ms |
| | HS2 | HBA2 | 2Gbps | 2 | 80% | 90% | 2.9ms |
| | HS3 | HBA1 | 40Gbps | 1 | 15% | 20% | <1ms |
| | HS4 | HBA1 | 40Gbps | 1 | 20% | 25% | <1ms |
| ... | ... | ... | ... | ... | ... | ... | ... |

COMPUTER SYSTEM AND MANAGEMENT SYSTEM THEREFOR

TECHNICAL FIELD

This invention relates to a computer system and a management system therefor and, in particular, relates to locating a volume or a host program in the computer system.

BACKGROUND ART

Recent drastic increase in the amount of information handled by computers promotes expansion of the scale of data centers hosting host computers and storage systems for processing information. Servers, storage systems, and networks installed in data centers have attained technological progress to reduce management costs on an individual apparatus basis.

For servers, with enhancement of performance in units of apparatuses, an architecture implementing a virtualization mechanism in a highly-integrated blade-type apparatus is beginning to be employed to achieve load balancing among a plurality of servers. To storage systems, a design is applied that stores consolidated massive data in a largescaled storage system with high performance, high reliability, and high availability, instead of storing massive data in a number of small storages. As to network equipment, increasing the number of connections per apparatus improves performance to bear increased traffic among systems.

In such circumstances, data centers come to face a problem of management cost for procuring individual apparatuses and constructing and operating large-scale systems. To reduce the cost, integrated systems including built-up systems with servers, storages, and networks are beginning to be proposed.

Such an integrated system includes built-up components of servers, storage systems, and networks with determined specifications; accordingly, if it is assumed to use it within the range of its specified performance, construction and operation costs can be reduced.

An issue to improve the system performance is management of storage systems. Because of difficulties in designing performance and capacity, and difficulties in building up a storage area network (SAN), a large-scale data center employs an administrator specialized in the storage system; accordingly, simplification is particularly desired and techniques are under development.

One of the techniques to achieve a large-scale storage system is a storage area network. A storage area network connects one or more storage systems to a plurality of host computers so that a plurality of host storages can share a huge capacity storage system. Such computer systems are currently widespread.

An advantage of such a computer system is an outstanding extendability: storage resources and computer resources can be easily added, deleted, or replaced at a later occasion. For a storage system that connects to a SAN, a storage system including RAID (Redundant Array of Independent Disk) structured storage apparatuses are commonly used.

A fibre channel switch included in the SAN provides a zoning function. A zone is a unit of logical separation of a fibre channel network. A scheme of this fibre channel zoning configures a zone with a group of network interfaces.

The network interfaces registered in a zone do not accept data transfer to and from network interfaces which are not registered in the zone. In other words, data transfer is available only among the network interfaces registered in the zone. The fibre channel switch manages information on equipment connected to the SAN fabric to update the statuses in response to a log-in of new equipment or a log-out, or to respond to a query about connection status.

Patent Literature 1 discloses a storage system including a plurality of virtual volumes and pools. Each pool has a hierarchical structure having a plurality of tiers different in performance. The storage system manages information indicating the relationship between virtual volumes and real areas and information indicating access frequencies to the real areas. The management system has management information indicating required performance and actual performance of the virtual volumes. The management system determines a virtual volume in an inappropriate condition with reference to the management information and performs a migration concerning the pool of the determined virtual volume to change the condition thereof to be satisfactory.

CITATION LIST

Patent Literature

PTL 1: WO 2011/092738 A

SUMMARY OF INVENTION

Technical Problem

If system performance required for a storage system enlarges to exceed the performance of a single storage system, it is important to use a plurality of storage systems as a resource for expansion of the system performance and reduction in management costs.

However, in a configuration (a single storage pool configuration) where a plurality of storage systems are interconnected with a SAN for data transfer and volumes can be transferred via the SAN, the SAN may not be uniform among a host computer and the plurality of storage systems.

In such a system, a volume migration from a storage system to another within a transferable range of volume indicated by the management system may cause a significant change in I/O (Input/Output) performance of the volume for the host computer. In particular, if the I/O bandwidth of a path between the storage system of the destination and the host computer is narrow, the I/O performance of the volume for the host computer drops.

In another case where a virtual machine is deployed in one of the storage systems which constitute a single storage pool, the I/O performance may be different depending on the storage system in which the virtual machine is deployed because the SAN is not uniform among the host computer and the storage systems. In particular, if the I/O bandwidth of a path between the storage system and the host computer is narrow, the I/O performance of the volumes for the deployed virtual machine will be low.

Solution to Problem

An aspect of the invention is a computer system comprising a plurality of host computers in which a plurality of host programs are executed, a plurality of storage systems including a plurality of volumes provided to the plurality of host programs, and a management system, wherein. Each of the plurality of host programs is located at a port of a host computer. Each of the plurality of volumes is located at a port of a storage system. The management system obtains information on bandwidths of a plurality of paths included in a data communication network among the plurality of storage systems and the plurality of host computers. The management system determines priority levels of individual candidate ports for new location of at least either one of a first host program and a first volume with reference to the information.

Advantageous Effects of Invention

An aspect of this invention achieves selection of appropriate location of a volume and a host program. Other problems to be solved, configurations, and advantageous effects will be clarified by the following description of embodiments.

BRIEF DESCRIPTION OF DRAWINGS

FIG. 8 is a drawing illustrating a configuration example of a storage system management table in the management computer in the first embodiment.

FIG. 9 is a drawing illustrating a configuration example of a connection apparatus management table in the management computer in the first embodiment.

FIG. 10 is a drawing illustrating a configuration example of a transfer range management table in the management computer in the first embodiment.

FIG. 11 is a drawing illustrating a configuration example of a storage topology management threshold table in the management computer in the first embodiment.

FIG. 12 is a drawing illustrating a configuration example of a volume management table in the management computer in the first embodiment.

FIG. 14 is a drawing illustrating a configuration example of a thin provisioning usage management table in the management computer in the first embodiment.

FIG. 15 is a drawing illustrating a configuration example of a destination recommendation level table in the management computer in the first embodiment.

FIG. 17 is a drawing illustrating a configuration example of a storage topology management table in a storage system in the first embodiment.

FIG. 21 is a drawing illustrating a configuration example of a connection apparatus management table in a connection apparatus in the first embodiment.

FIG. 26 is a drawing illustrating a configuration example of a volume access condition management table in the storage system in the second embodiment.

FIG. 29 is a drawing illustrating a configuration example of a host management table in the management computer in the third embodiment.

FIG. 30 is a drawing illustrating a configuration example of a host topology management threshold table in the management computer in the third embodiment.

FIG. 32 is a drawing illustrating a configuration example of a host topology management table in the storage system in the third embodiment.

DESCRIPTION OF EMBODIMENTS

Hereinafter, embodiments of this invention will be described with reference to the accompanying drawings. For clarity of explanation, the following descriptions and the accompanying drawings contain omissions and simplifications as appropriate. A part of the configuration of any one of the embodiments can be replaced with that of a different embodiment. Also, the configuration of any one of the embodiments can be added to the configuration of a different embodiment. The embodiments illustrate some aspects of this invention, but this invention is not limited to the embodiments only.

First Embodiment

An information storage system in a first embodiment includes a plurality of storage systems and can transfer volumes (data) among the storage systems. In a preferred configuration, the information storage system can transfer a volume from a storage system to another without stopping I/O from a host (live volume-migration). Such an information storage system that allows a volume transfer from a storage system to another is also called single storage pool.

A host computer can access volumes in the plurality of storage systems in the information storage system via a network. An operating system (OS), which is a host program, or a virtual machine (including a guest OS) runs on the host computer.

The first embodiment determines priority levels of candidate destination ports for a volume with reference to information on the configurations and the bandwidth properties of paths between storage systems in a data network among the host computer and the storage systems. The candidate destination ports are ports in the current storage system and different storage systems. This determination leads to less change in performance in access from the host computer to the volume between before and after the volume migration.

To calculate the priority level of a candidate destination port, this embodiment uses information on the configuration and the bandwidth properties of the path between the source storage system port and the destination storage system port. This enables determination of an appropriate destination for a volume without information on the paths between the host computer and the storage systems.

The first embodiment refers to the number of transit connection apparatuses (switches) in a path as an example of the configuration information on the path and the minimum bandwidth in the path as an example of the bandwidth properties of the path. In an example, the first embodiment further refers to the usage of the path to determine the priority level. Referring to such information leads to proper determination of a priority level of the candidate destination storage system. Hereinafter, more specific configuration of the first embodiment will be explained with reference to the drawings.

Figure 1:
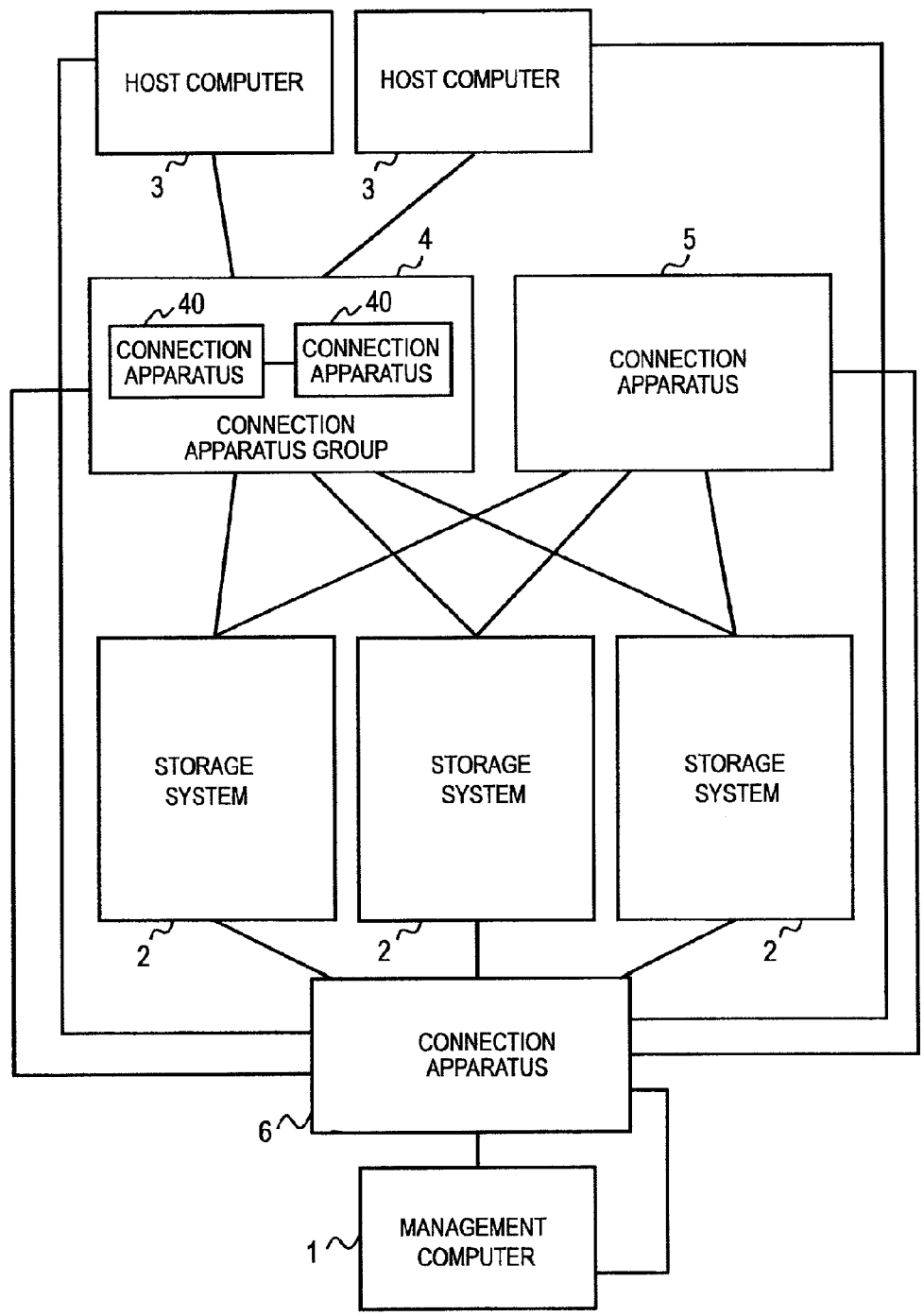
FIG. 1 is a configuration diagram of an overall computer system in the first embodiment.

FIG. 1 is a diagram for illustrating a configuration example of an overall computer system in the first embodiment. As illustrated in this diagram, the computer system includes a management computer 1, a plurality of (three in the example of FIG. 1) storage systems 2, one or more (two in the example of FIG. 1) host computers 3, a connection apparatus group 4 that consists of a plurality of connection apparatuses 40, and connection apparatuses 5 and 6. The connection apparatuses in this computer system are switches that analyze data received at their input ports to select output ports to transmit the data and transmit the received data from the selected output ports. For example, the connection apparatuses are fibre channel switches.

Each of the management computer 1, the storage systems 2, the host computers 3, the connection apparatuses 40 in the connection apparatus group 4, and the connection apparatuses 5 and 6 has one or more ports; each port of the apparatus (including the management computer 1, the storage systems 2, and the host computers 3) is connected to a port (opposed port) of a different apparatus. A port is typically connected to its opposed port with a cable.

The connection apparatus group 4 connects the host computers 3 and the storage systems 2 to be communicable with one another and transfers data (host data) among them. Each connection apparatus 40 in the connection apparatus group 4 has a plurality of ports; each port of the connection apparatus 40 is connected to a port of a host computer 3, a storage system 2, or a different connection apparatus 40 in the connection apparatus group 4.

The connection apparatus group 4 transfers data I/O requests (requests for input or output of data) and write data from the host computers 3 to the storage systems 2. In addition, it transfers read data from the storage systems 2 to the host computers 3. The connection apparatus group 4 further includes paths connecting the storage systems 2. In this architecture, however, a volume (data) transfer from a storage system 2 to another is performed via the connection apparatus 5.

The connection apparatus 5 transfers data from a storage system 2 to another. The connection apparatus 5 has a plurality of ports, which are connected to the ports of the storage systems 2. The connection apparatus 5 transfers data I/O requests and requested data among the storage systems 2. The storage systems 2 in this embodiment transfer a volume (data) from a storage system 2 to another. The volume migration is performed via the connection apparatus 5.

The connection apparatus 6 connects the management computer 1 to the other apparatuses, namely, the storage systems 2, the host computers 3, the connection apparatuses 40 in the connection apparatus group 4, and the connection apparatus 5 to be communicable and transfers data between the management computer 1 and the other apparatuses. The connection apparatus 6 has a plurality of ports; each port is connected to the port of the management computer 1 or any one of the other apparatuses. The connection apparatus 6 transfers requests for management communication from the management computer 1 to the storage systems 2, the host computers 3, the connection apparatuses 40 in the connection apparatus group 4, and the connection apparatus 5 and transfers their responses to the management computer 1.

In this computer system, a SAN (Storage Area Network) is configured among the host computers 3 and the storage systems 2 with the connection apparatus group 4. Another SAN is configured among the storage systems 2 with the connection apparatus 5. The storage systems 2 may be connected directly to one another without the connection apparatus 5. In this example, the entire computer system can be connected from the management computer 1 via an IP network using the connection apparatus 6.

The network by the connection apparatus group 4 and the network by the connection apparatus 5 may be logically independent networks provided by physically the same apparatus. The network by the connection apparatus group 4 and the network by the connection apparatus 5 may be IP networks configured with iSCSI (Internet Small Computer System Interface). Alternatively, they may be logically independent networks provided by the same apparatus of the IP network provided by the connection apparatus 6.

Moreover, the networks by the connection apparatus group 4, and the connection apparatus 5 and 6 may be configured with FCoE (Fibre Channel over Ethernet); they may be logically independent networks provided by the same apparatus.

Figure 2:
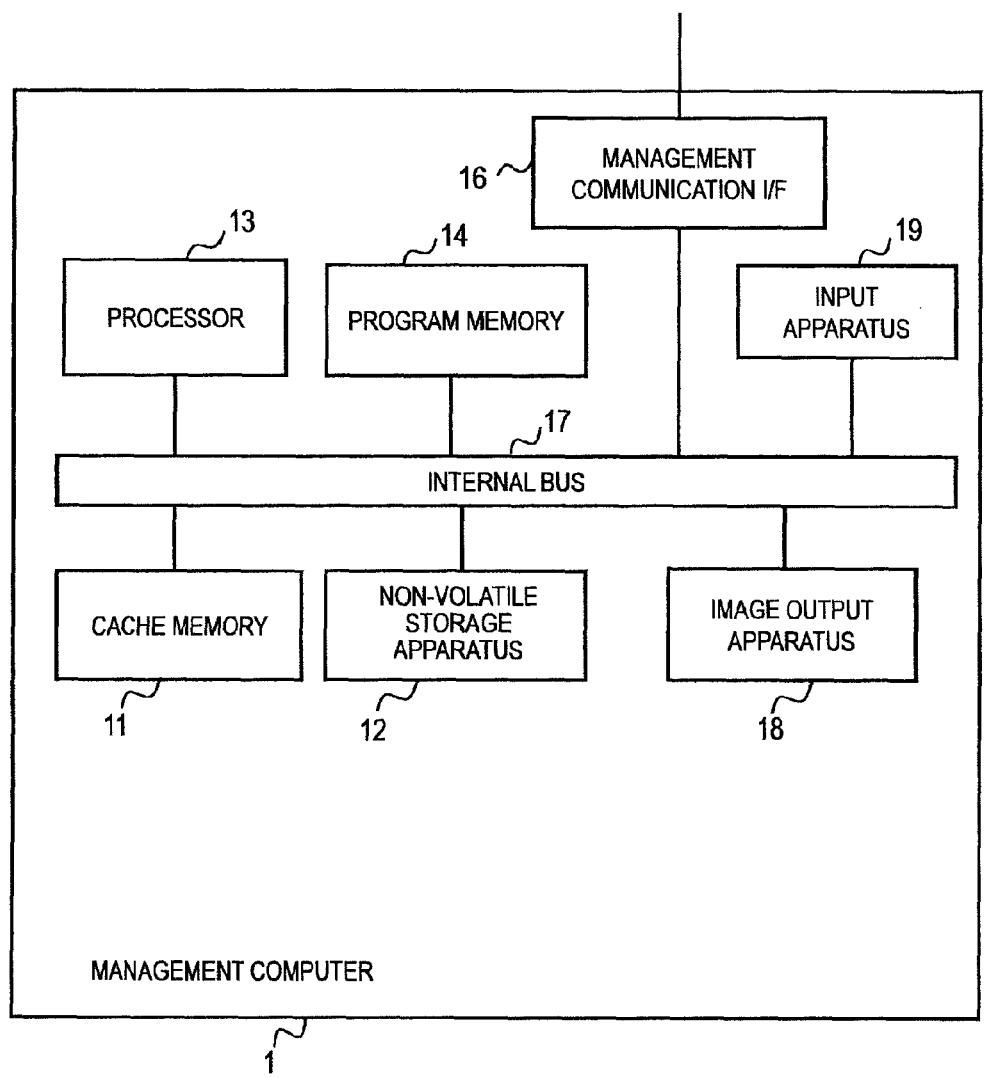
FIG. 2 is a diagram exemplifying a hardware configuration of a management computer in the first embodiment.

FIG. 2 illustrates an example of the hardware configuration of the management computer 1. The management computer 1 is a computer including a cache memory 11, a non-volatile storage apparatus 12, a processor 13, a program memory 14, a management communication I/F 16, an internal bus 17, an image output apparatus 18, an input apparatus 19. The non-volatile storage apparatus 12 may be an external storage apparatus connected via a network.

The management computer 1 loads software such as an operating system (OS) and application programs stored in the non-volatile storage apparatus 12 to the program memory 14; the processor 13 retrieves them from the program memory 14 and executes them to provide predetermined functions. The processor 13 may include a plurality of chips or a plurality of packages. The same applies to the other apparatuses (including the storage systems 2).

The management computer 1 temporarily stores frequently used data in the cache memory 11 to enhance the processing speed. The management computer 1 includes an input apparatus 19 such as a keyboard and a mouse and an image output apparatus 18 such as a monitor. The input apparatus 19 accepts inputs from the administrator (user) and the image output apparatus 18 outputs information specified by the processor 13. The management computer 1 further includes a management communication I/F 16 for connecting to the connection apparatus 6.

In the configuration example of FIG. 1, a management system is configured with the management computer 1, but the management system may be configured with a plurality of computers: one may be a computer for display and the other plurality of computers may perform jobs equivalent to those in the management computer for speedy management and higher reliability. The management system can include a part of the functions of the storage systems or the connection apparatuses.

Figure 3:
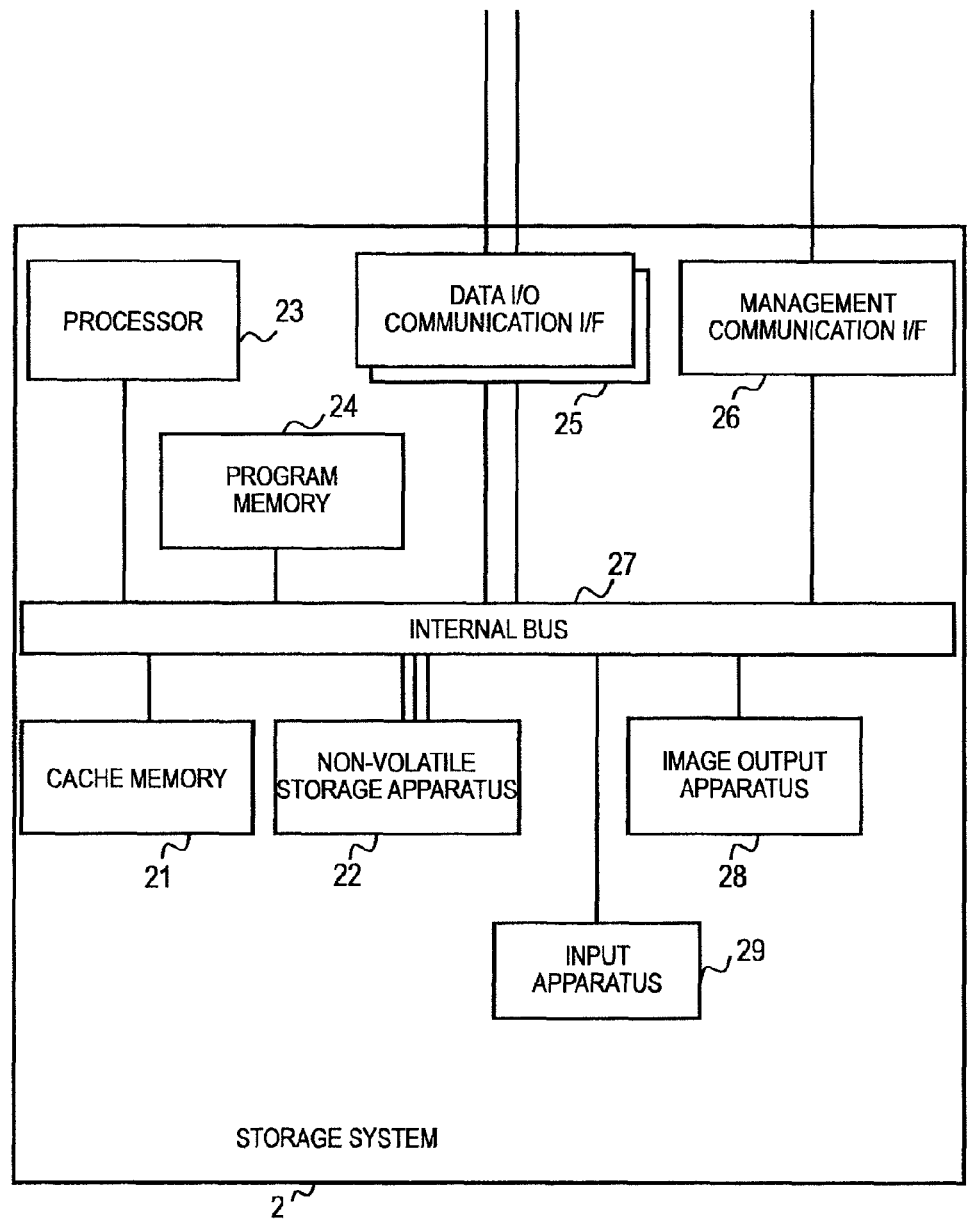
FIG. 3 is a diagram exemplifying a hardware configuration of a storage system in the first embodiment.

FIG. 3 illustrates an example of the hardware configuration of a storage system 2. The storage system 2 includes a cache memory 21, a non-volatile storage apparatus 22, a processor 23, a program memory 24, a data I/O communication I/F 25, a management communication I/F 26, an internal bus 27, an image output apparatus 28, and an input apparatus 29.

The storage system 2 loads software such as an OS and control programs stored in the non-volatile storage apparatus 22 to the program memory 24; the processor 23 retrieves them from the program memory 24 and executes them to provide predetermined functions. The processor 23 functions as a controller of the storage system 2. The storage system 2 stores frequently used data in the cache memory 21.

The non-volatile storage apparatus 22 includes a plurality of storage drives. The storage drives include hard disk drive (HDDs) having non-volatile magnetic disks and solid state drives (SSDs) with non-volatile semiconductor memories (such as flash memories) embedded therein. The storage drives store data sent from the host computers 3. A plurality of storage drives achieve redundancy of data by RAID operations, preventing data loss when a failure occurs to some storage drive. The volume configuration in the non-volatile storage apparatus 22 will be described later.

The storage system 2 includes an input apparatus 29 such as a keyboard and a mouse and an image output apparatus 28 such as a monitor. The input apparatus 29 accepts inputs from the administrator (user) and the image output apparatus 28 outputs information specified by the processor 23. The storage system 2 includes data I/O communication I/Fs 25 each for connecting to the connection apparatus group 4 and the connection apparatus 5 and a management communication I/F 26 for connecting to the connection apparatus 6. The administrator can manage and control the storage system 2 while accessing the storage system 2 from the management computer 1 via the connection apparatus 6.

For simplicity, FIG. 1 shows three storage systems 2 but the number of storage systems depends on the system design. To a data I/O communication I/F 25, a port ID unique to the computer system is assigned, and a plurality of virtual port IDs can be assigned using NPIV (N_Port ID virtualization) or any other virtualization scheme.

For example, the NPIV virtualizes the ID of an N_Port and assigns a plurality of virtual ports to one physical port (N_Port). The NPIV can assign virtual ports of a plurality of host computers 3 or virtual machines to one physical port. To use a virtual port, the virtual port ID is associated with a physical port ID within the computer system. In the following explanation, the term port ID, of a computer, a storage system, or a connection apparatus, means an ID of a physical port unless specifically indicated.

Figure 4:
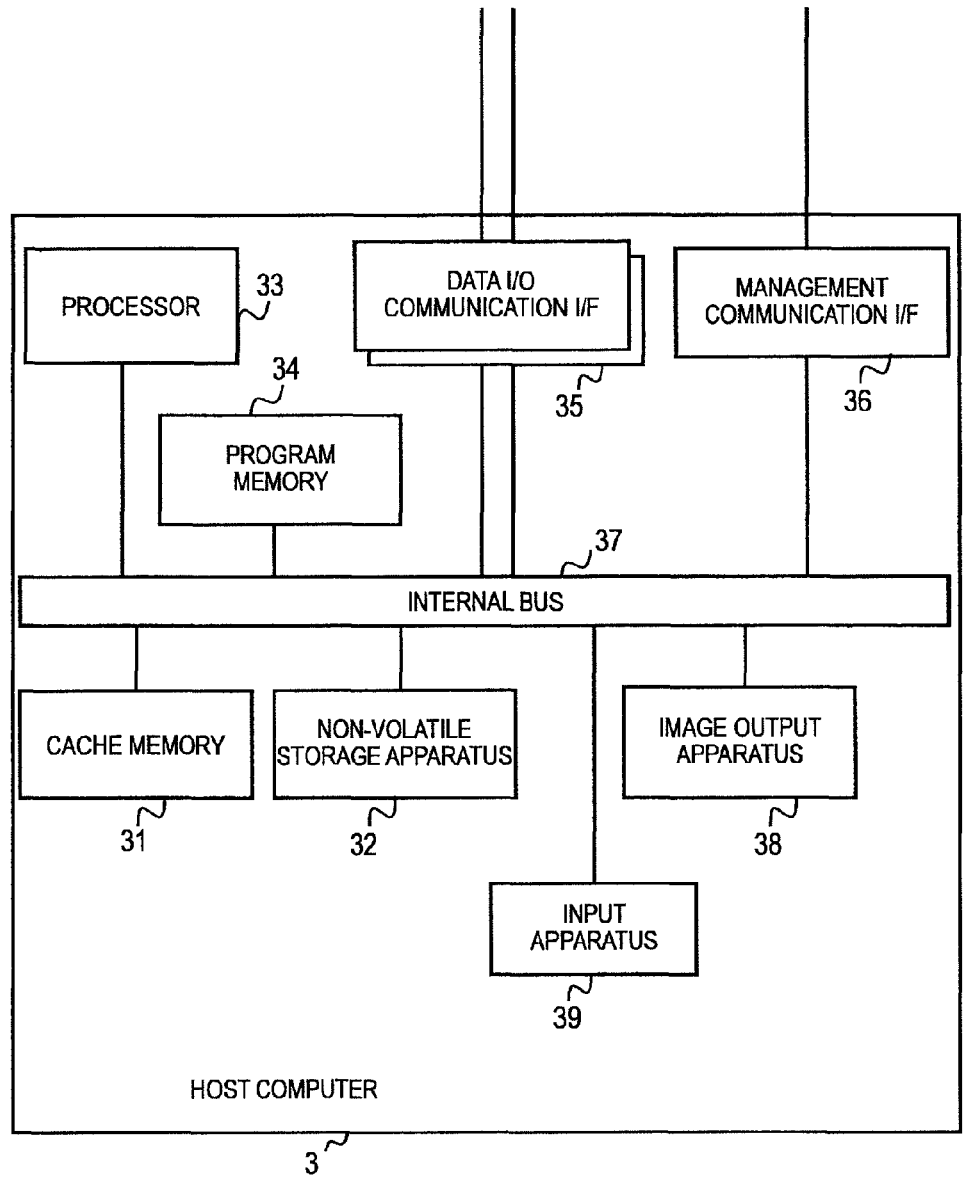
FIG. 4 is a diagram exemplifying a hardware configuration of a host computer in the first embodiment.

FIG. 4 illustrates an example of the hardware configuration of a host computer 3. The host computer 3 is a computer including a cache memory 31, a non-volatile storage apparatus 32, a processor 33, a program memory 34, a data I/O communication I/F 35, a management communication I/F 36, an internal bus 37, an image output apparatus 38, and an input apparatus 39.

The host computer 3 loads software such as an OS and application programs stored in the non-volatile storage apparatus 32 to the program memory 34; the processor 33 retrieves them from the program memory 34 and executes them to provide predetermined functions. The processor 3 stores frequently used data in the cache memory 31.

The host computer 3 includes an input apparatus 39 such as a keyboard and a mouse and an image output apparatus 38 such as a monitor. The input apparatus 39 accepts inputs from the administrator (user) and the image output apparatus 38 outputs information instructed by the processor 33. The host computer 3 includes one or more data I/O communication I/Fs 35 for connecting to the connection apparatus group 4 and a management communication I/F 36 for connecting to the connection apparatus 6.

For simplicity, FIG. 1 shows two host computers 3 but the system may include any number of host computers 3. To a data I/O communication I/F 35, a port ID unique to the computer system is assigned, and a plurality of virtual port IDs can be assigned using the NPIV or any other virtualization scheme. For example, the NPIV can assign virtual ports of a plurality of virtual machines to a physical port of the host computer 3.

Figure 5:
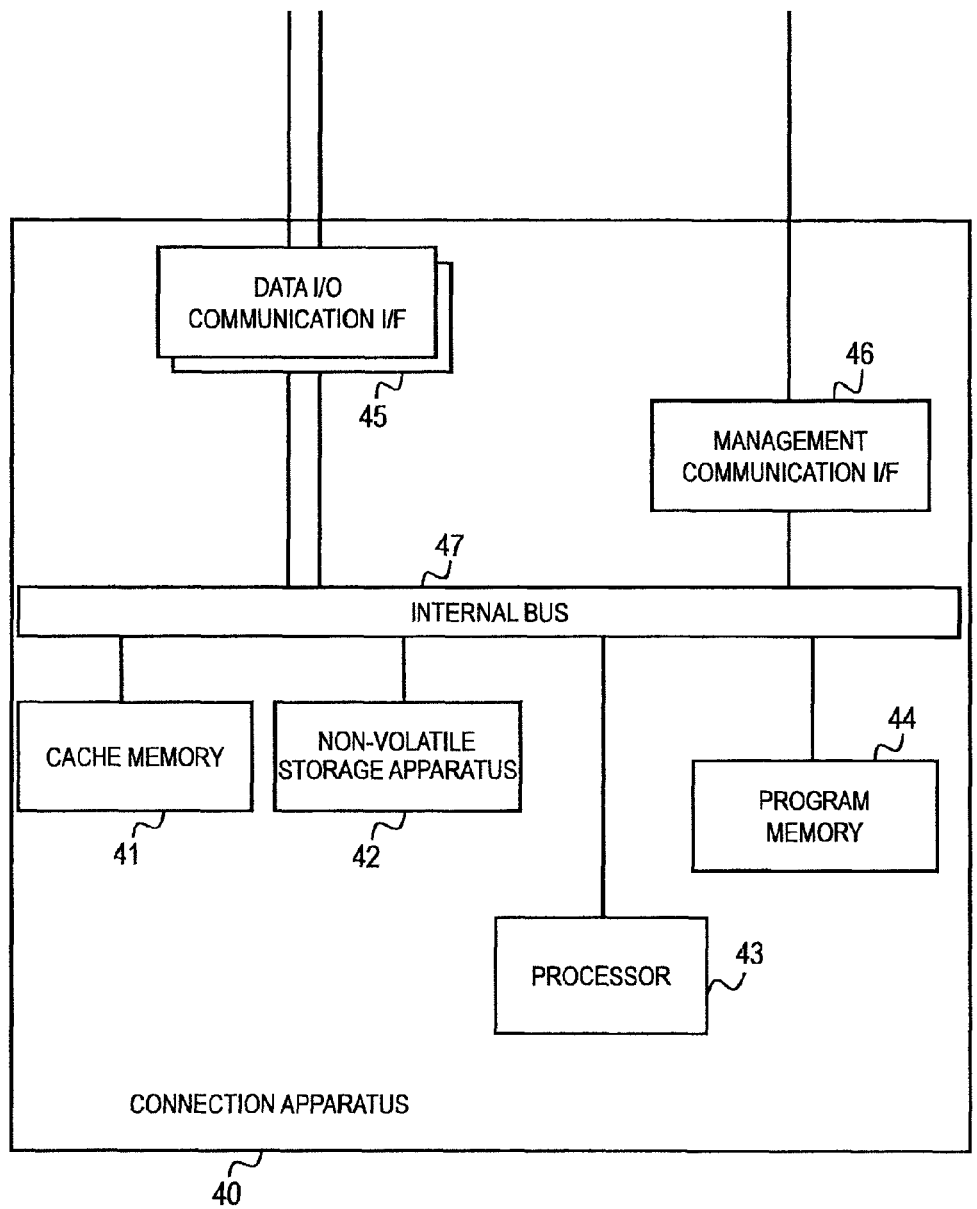
FIG. 5 is a diagram exemplifying a hardware configuration of a connection apparatus in the first embodiment.

FIG. 5 illustrates an example of the hardware configuration of a connection apparatus 40 in the connection apparatus group 4. The connection apparatus includes a cache memory 41, a non-volatile storage apparatus 42, a processor 43, a program memory 44, a data I/O communication I/F 45, a management communication I/F 46, and an internal bus 47.

The connection apparatus 40 loads software such as an OS and control programs stored in the non-volatile storage apparatus 42 to the program memory 44; the processor 43 retrieves them from the program memory 44 and executes them to provide predetermined functions. The connection apparatus 40 stores frequently used data in the cache memory 41. The connection apparatuses 5 and 6 may have the same configuration as the connection apparatus 40.

Figure 6:
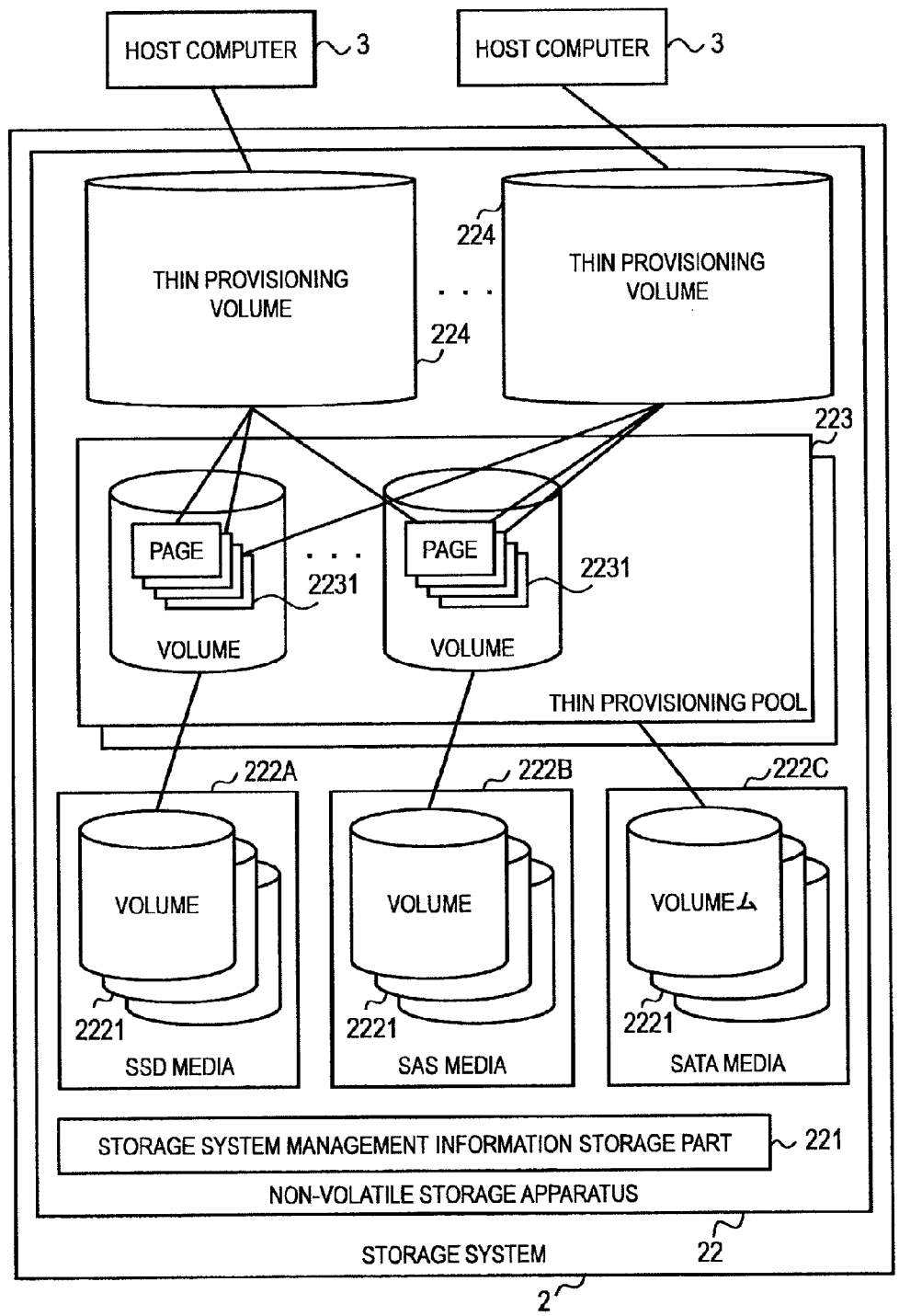
FIG. 6 is a diagram exemplifying a volume configuration of a non-volatile storage apparatus and stored information in the storage system in the first embodiment.

FIG. 6 illustrates a configuration of a non-volatile storage apparatus 22 in a storage system 2. The non-volatile storage apparatus 22 includes a storage system management information storage part 221 and different types of media 222A to 222C equipped with non-volatile storage media. In this embodiment, a component including storage areas provided by one or more storage drives and the interface therefor is referred to as a medium. Typically, a medium is a component including storage areas provided by a RAID group and the interface therefor.

In the example of FIG. 6, an SSD medium 222A which utilizes a flash memory of a semiconductor memory, a serial attached SCSI (SAS) medium 222B which includes a SAS interface, and a serial advanced technology attachment (SATA) medium 222C which includes a SATA interface are exemplified. The non-volatile storage apparatus 22 typically includes a plurality of SSD media 222A, a plurality of SAS media 222B, and a plurality of SATA media 222C.

The storage system 2 provides one or more volumes (real volumes) 2221 which are formed of real storage areas provided by the media and readable and writable from host computers 3 or thin provisioning pools 223. Each volume 2221 may be composed of storage areas of a single type of storage drives or may be provided from a RAID (Redundant Arrays of Independent Disks) configured with a plurality of types of storage drives. Hereinafter, an example in which each volume 2221 is formed of storage areas of a single type of storage drives will be described.

In a thin provisioning pool 223, a volume 2221 selected out of volumes 2221 of the media 222A to 222C by the administrator (user) is separated into a plurality of pages 2231. The thin provisioning pool 223 is managed in units of pages. Depending on the amount of data to be stored in a thin provisioning volume 224, pages are allocated to the thin provisioning volume 224.

The thin provisioning volume 224 is a virtual volume provided to a host computer 3 and the capacity is virtualized. Every time the host computer 3 writes data to the thin provisioning volume 224 to cause a need of a data storage area, the storage system 2 allocates a page 2231 to the thin provisioning volume 224.

Thin provisioning can make the capacity of a thin provisioning volume 224 recognized by a host computer 3 larger than the real capacity allocated to the thin provisioning volume 224 (the total capacity of all of the pages) and can make the real capacity to achieve the capacity allocated to the host computer 3 smaller than the allocated capacity.

In FIG. 6, a thin provisioning pool 223 includes a plurality of real volumes (pool volumes) 2221. The thin provisioning pool 223 typically includes a plurality of media different in performance capability in the storage system 2 and has a hierarchical structure having a plurality of tiers depending on access performance. Each tier is composed of one or more real volumes 2221.

The storage system 2 analyzes I/O from a host computer 3 to a thin provisioning volume 224, and automatically allocates pages highly loaded with I/O to a high-level tier, which is composed of resources of high-performance high-cost media, and the other pages to lower-level tiers, which are composed of resources of lower-performance lower-cost media.

Although not shown in FIG. 6, the storage system 2 can provide volumes of normal attribute, whose capacity is not virtualized and the capacity recognized by hosts is equal to the real capacity.

Figure 7:
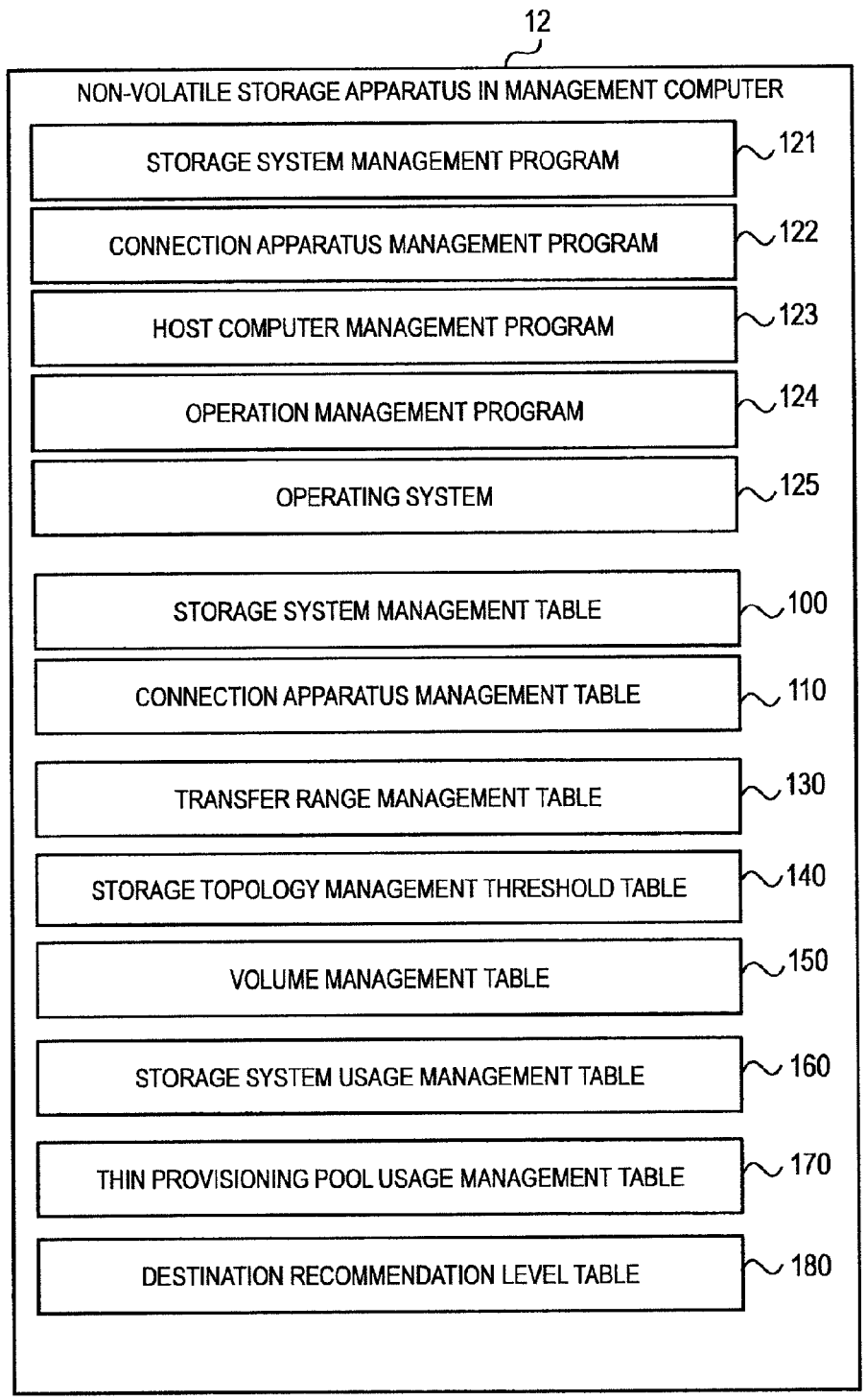
FIG. 7 is a drawing exemplifying information stored in a non-volatile storage apparatus in a management computer in the first embodiment.

FIG. 7 illustrates information stored in the non-volatile storage apparatus 12 in the management computer 1. A storage system management program 121 checks the statuses of the storage systems 2 in the computer system and sets configuration information on them through communication via the connection apparatus 6 connected from the management communication I/F 16. A connection apparatus management program 122 checks the statuses of the connection apparatuses 40 in the connection apparatus group 4 and the connection apparatus 5 and sets configuration information on them through communication via the connection apparatus 6 connected from the management communication I/F 16.

A host computer management program 123 checks the statuses of the host computers 3 in the computer system and sets configuration information on them through communication with agents 322 in the host computers 3 via the connection apparatus 6 connected from the management communication I/F 16. An operation management program 124 designs volume location and executes other jobs with reference to tables in the non-volatile storage apparatus 12 in the management computer 1. The operation management program 124 further manages operations in the computer system in cooperation with various programs and provides the administrator with a user interface. An operating system 125 is a platform for executing the various programs and for managing various tables.

The programs are executed by the processor 13 to perform predetermined jobs using the storage apparatus and the communication interface. Accordingly, in this embodiment, the explanations having the subjects of program may be explanations having the subjects of processor. The jobs executed by a program are the jobs executed by the computer or the computer system on which the program is running.

The processor 13 works in accordance with a program to work as an operation part to implement a predetermined function. For example, the processor 13 works in accordance with the storage system management program 121 to function as a storage system manager and works in accordance with the connection apparatus management program 122 to function as a connection apparatus manager. The same applies to the other programs.

Moreover, the processor 13 also works as operation parts to implement the individual jobs executed by the programs. The management computer 1 including the processor 13 and the programs is an apparatus including these operation parts. The explanations on the relationship between the programs and the processor and the relationship between these and the apparatus including them apply to the other apparatuses and systems, namely, each host computer 3, each connection apparatus in the connection apparatus group 4, the connection apparatus 5 or 6, and each storage system 2.

The non-volatile storage apparatus 12 further stores a storage system management table 100, a connection apparatus management table 110, a transfer range management table 130, a storage topology management threshold table 140, a volume management table 150, a storage system usage management table 160, a thin provisioning usage management table 170, and a destination recommendation level table 180.

In this embodiment, the information used by the management computer 1 does not depend on the data structure but may be expressed in any data structure. For example, a data structure appropriately selected from a table, a list, a database, and a queue can store the information. The same applies to the other apparatuses (including the storage systems).

FIG. 8 illustrates a configuration example of a storage system management table 100 in the management computer 1. The storage system management table 100 has columns of storage system IDs 1001 for storing unique IDs to manage the storage systems 2 in the computer system and management port IP addresses 1002. The management port IP addresses are IP addresses for the management computer 1 to communicate with the storage systems 2.

Foe example, these values are inputted by the administrator. In this embodiment, IDs, names, and numbers are used as information for identifying objects, but these nominal designations can be replaced with one another. An entry of the storage system management table 100 is added or deleted with an addition or a deletion of a storage system 2 in the computer system.

FIG. 9 is a drawing illustrating a configuration example of a connection apparatus management table 110 in the management computer 1. The connection apparatus management table 110 has columns of connection apparatus IDs 1101 and management port IP addresses 1102 of the connection apparatuses. Values in each column are inputted by the administrator through the operation management program 124. The connection apparatus IDs are identifiers unique to the computer system. The management port IP addresses are IP addresses for the management computer 1 to communicate with the connection apparatuses. The management computer 1 refers to this table for management communication with the connection apparatus group 4 or connection apparatus 5 or 6.

FIG. 10 illustrates a configuration example of the transfer range management table 130 in the management computer 1. The transfer range management table 130 defines ranges to which volumes can be transferred, specifically, physical ports that can be the destinations of the volumes. A physical port is uniquely identified with a storage system ID and a port ID in the computer system. The transfer range management table 130 is a table for storing information on single storage pools and the storage systems 2 and their ports included in the individual single storage pools.

In this example, a volume can be transferred within the single storage pool the volume belongs to. A host computer 3 can access any port in the single storage pool and perform a live volume-migration (transfer of a volume without stopping the system) in the single storage pool. The volume transfer range can be defined differently depending on the design.

As shown in FIG. 10, the transfer range management table 130 includes columns of single storage pool IDs 1301, storage system IDs 1302, and port IDs 1303. For example, in the transfer range management table 130 of FIG. 10, a single storage pool SPool1 consists of storage systems ST1, ST2, and ST3. A volume to which any one of the ports of the single storage pool SPool1 has been assigned can be transferred to a different port in the single storage pool SPool1.

A volume can be transferred from a storage system 2 which holds the volume to a different storage system 2 within the same single storage pool; otherwise, it can be transferred within the storage system 2 which holds the volume. Such transfer within the same storage system 2 is a change of the port assigned.

FIG. 11 shows an example of the storage topology management threshold table 140 to be used by the management computer 1. The storage topology is a topology of the network connecting the storage systems 2 in the network which connects the storage systems 2 and the host computers 3 (the network by the connection apparatus group 4). Specifically, it includes information on the configuration and the bandwidth of a path between storage systems 2. This example employs the number of transit connection apparatuses in the path as the configuration information on the path and the minimum bandwidth in the path as the bandwidth information on the path.

The storage topology management threshold table 140 includes columns of thresholds for minimum bandwidth 1401, thresholds for the number of transit connection apparatuses 1402, thresholds for average bandwidth usage rate of the lowest-bandwidth path 1403, thresholds for peak bandwidth usage rate of the lowest-bandwidth path 1404, and thresholds for latency 1405. The operation management program 124 refers to the storage topology management threshold table 140 in calculating a recommendation level of a destination port of a volume. The details of the method of calculating the recommendation level will be described later. The values in the storage topology management threshold table 140 are preset by the administrator.

The threshold for minimum bandwidth is a threshold for the minimum bandwidth in a path (including one or more connection apparatuses 40) between the ports of two storage systems 2. The threshold for the number of transit connection apparatuses is a threshold for the number of transit connection apparatuses in a path between the ports of two storage systems 2. The lowest-bandwidth path is a path whose bandwidth is the lowest in the paths included in the path between the ports of two storage systems 2.

A path between two storage system ports includes ports of connection apparatuses and paths between a storage system port and a connection apparatus port. It may include paths between two connection apparatus ports. For example, in the case where a path between storage system ports runs through a plurality of connection apparatuses 40 and the bandwidth of the path between the ports of some connection apparatus pair is the lowest, the path between the connection apparatuses is the lowest-bandwidth path. The minimum bandwidth of a path is determined depending on the minimum value in the bandwidth for a port pair terminating the path.

The average bandwidth usage rate is an average of the bandwidth usage rates of a path in a predetermined time period, for example, one hour. Specifically, it is a value obtained by dividing an average of the bandwidth used in a predetermined time period (expressed in bps, for example) by the specified bandwidth for the path. The peak bandwidth usage rate is the highest bandwidth usage rate in the predetermined time period. For example, in the case where the specified bandwidth for a path is expressed in bps, it is the value obtained by dividing the highest bits-per-second value in the predetermined time period by the specified bandwidth for the path.

FIG. 12 shows a configuration example of the volume management table 150 in the management computer 1. The volume management table 150 manages volumes existing in the computer system with unique numbers assigned. The volume management table 150 includes a column of volume numbers 1501; each volume is assigned a volume number. Information on the other items is managed in association with the volume numbers.

A column of capacities 1502 stores volume capacities of individual volumes, the column of the amounts of usage 1503 stores the amounts of usage of the volumes. A column of volume types 1504 indicates which of the normal volume, thin provisioning volume, and pool volume (a volume providing a thin provisioning pool with a real capacity) each volume is.

The volume management table 150 further has a column of storage system IDs 1505 which indicates the storage systems holding the volumes, a column of volume IDs 1506 which indicates identification information for uniquely identifying the volumes in the particular storage system (only), and a column of port IDs 1507 which indicates the ports assigned to the volumes. The port IDs are values unique to each storage system 2.

An entry of the volume management table 150 can be created, for example, by the administrator using the operation management program 124 at creation of a volume. The storage system management program 121 obtains information to be stored in the volume management table 150 from the storage systems 2 and stores it.

Figure 13:
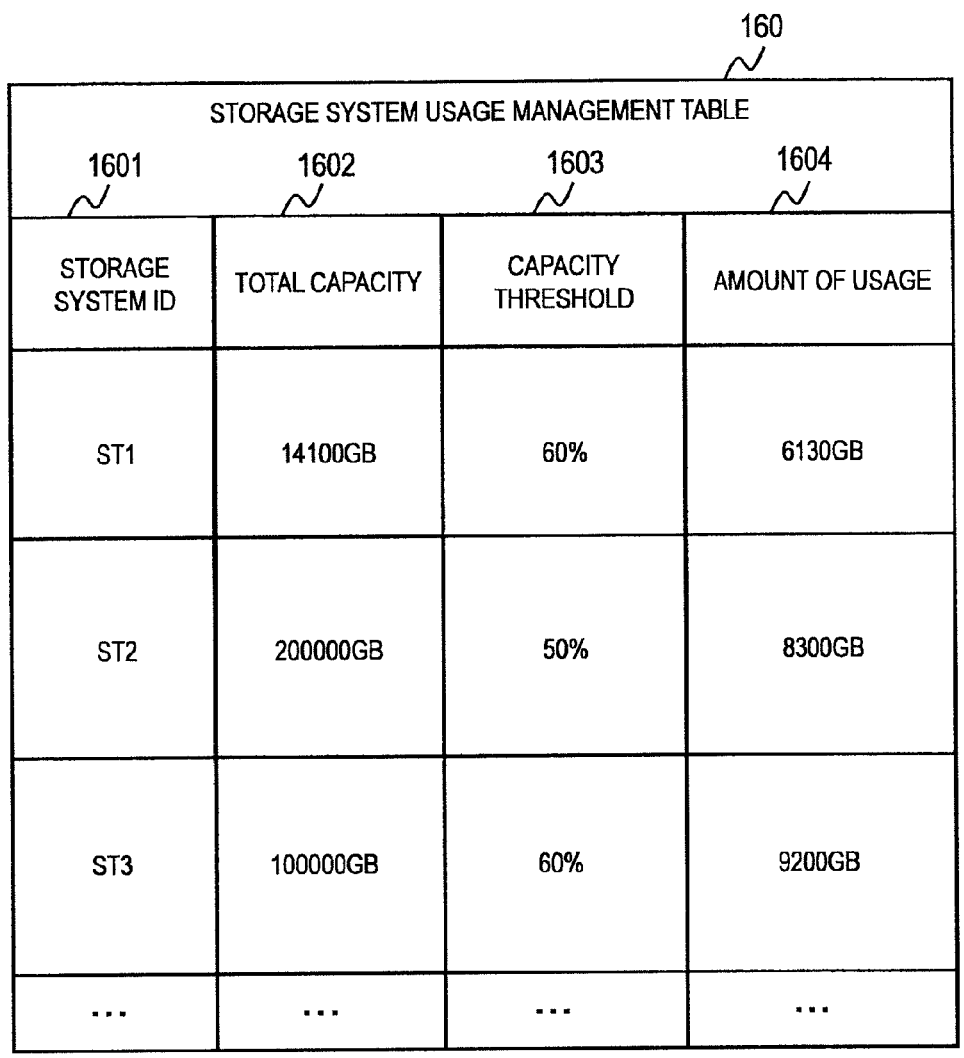
FIG. 13 is a drawing illustrating a configuration example of a storage system usage management table in the management computer in the first embodiment.

FIG. 13 is a drawing illustrating a configuration example of the storage system usage management table 160 in the management computer 1. The table 160 manages the usage of the capacities of the storage systems 2. The storage system usage management table 160 has a column of storage system IDs 1601.

The storage system usage management table 160 further has columns of total capacities 1602, capacity thresholds 1603, and the amounts of usage 1604 of the storage systems 2 identified by the storage system IDs. The values of the total capacities are obtained from the administrator or the storage systems 2 and the capacity thresholds are determined by the administrator. To obtain the amounts of usage, the storage system management program 121 in the management computer 1 periodically makes an inquiry to each storage system 2 via the connection apparatus 6 and stores obtained values in the table 160.

FIG. 14 is a drawing illustrating an example of the thin provisioning pool usage management table 170 in the management computer 1. The thin provisioning pool usage management table 170 manages the usage of thin provisioning pools 223 in the computer system. FIG. 14 exemplifies information on only one thin provisioning pool TPool1. The thin provisioning pool usage management table 170 has a column of pool IDs 1701 commonly determined in the computer system, a column of total capacities 1702 provided by one or more storage systems, and a column of the amounts of usage 1703 of those storage systems.

Moreover, the thin provisioning pool usage management table 170 stores IDs of the individual storage systems 2 that constitute a pool in the column 1704 and has columns of capacities 1705, the amounts of usage 1706, and IOPS (Input Output Per Second) 1708 for the individual storage systems.

Moreover, the thin provisioning usage management table 170 has a column of capacity thresholds 1707 and performance thresholds 1709 to be used in coordination when the amount of usage and the TOPS in a storage system 2 exceed those thresholds. An entry of the thin provisioning pool usage management table 170 is, for example, added when the administrator makes an instruction to create a thin provisioning pool 223 and deleted when the administrator makes an instruction to delete a thin provisioning pool 223.

The capacity thresholds and the performance thresholds can be set by the administrator using the operation management program 124. To obtain the values for the columns of amounts of usage 1706 and IOPSs 1708, the storage system management program 121 in the management computer 1 periodically issues inquiries to the storage systems 2 via the connection apparatus 6 and stores the values obtained from the storage systems 2 to those fields.

FIG. 15 shows an example of the destination recommendation level table 180 in the management computer 1. The destination recommendation level table 180 is a table indicating recommendation levels of other ports to be the destination ports for a volume connected to a port. The destination recommendation level table 180 of FIG. 15 is an example of a table indicating recommendation levels of the destination ports for the port PT1 in the storage system ST1. The recommendation level is a value to indicate a priority level of a destination port.

The operation management program 124 in the management computer 1 can calculate the destination recommendation level of each port from the path information obtained from the storage systems 2. In typical, the operation management program 124 creates the destination recommendation level table 180 for each port in each storage system 2 at the determination of the destination of a volume. The calculation of the recommendation level will be described later.

In transferring a volume, the recommendation levels in the destination recommendation level table 180 are presented to the administrator. The administrator refers to the presented recommendation levels to determine the destination of the volume. Alternatively, the management computer 1 may automatically determine the destination of the volume with reference to the calculated recommendation level (priority level).

The destination recommendation level table 180 of FIG. 15 has columns of single storage pool IDs 1801, storage system IDs 1802, destination port IDs 1803, and destination recommendation levels 1804. In this example, the more the number of stars in the destination recommendation level column 1804, the higher the recommendation level.

In the example of FIG. 15, the volume connected to the port PT1 in the storage system ST1 can be transferred to the other ports in the single storage pool SPool1 except for the particular port PT1. As indicated in FIG. 15, the destination ports include the other ports in the same storage system ST1. The paths from different ports in one storage system 2 to a host computer 3 run through the same connection apparatus or different connection apparatuses. If the ports of the connection apparatus(es) 40 in two paths are different, their bandwidth properties can be different.

Figure 16:
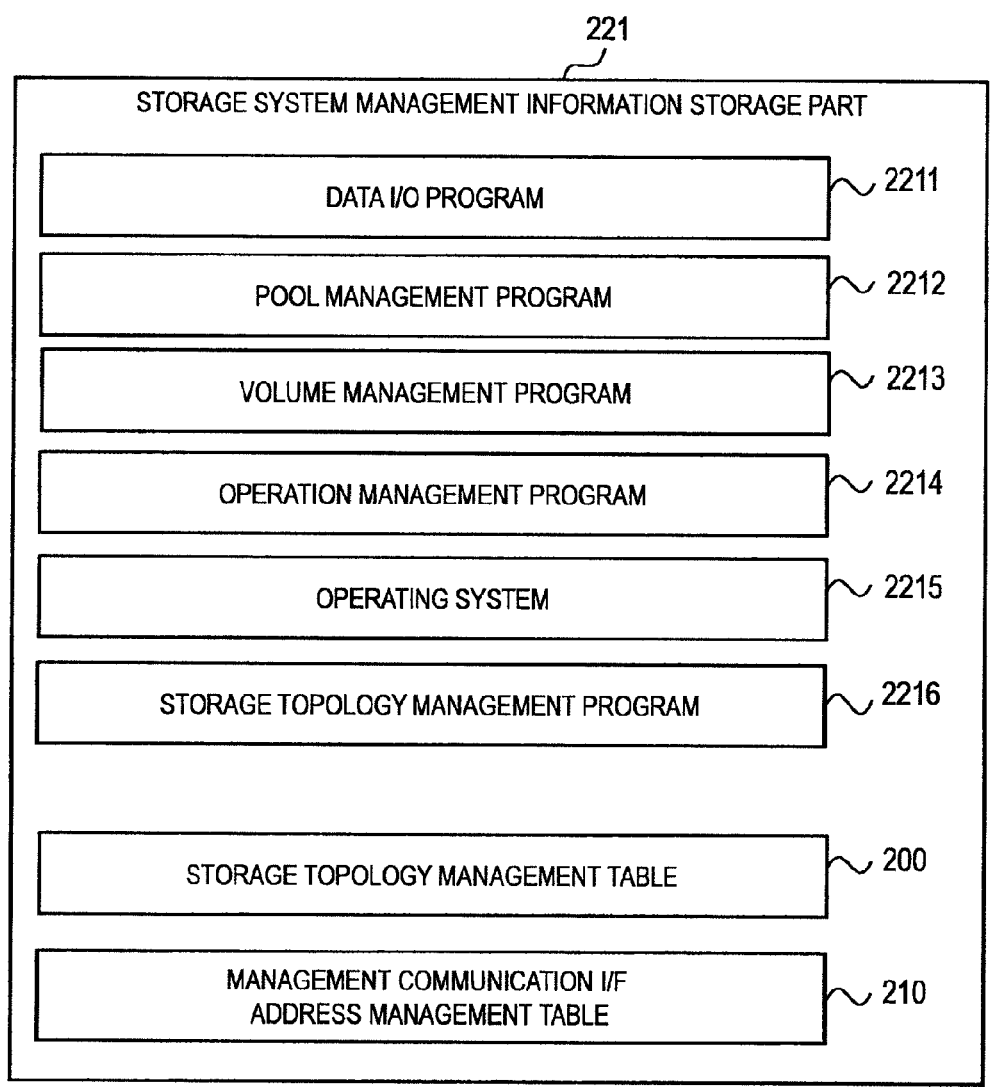
FIG. 16 is a drawing exemplifying information stored in a management information storage part in a storage system in the first embodiment.

FIG. 16 illustrates information stored in the storage system management information storage part 221 in each storage system 2. A data I/O program 2211 communicates with the host computers 3 in the computer system via the connection apparatus group 4 connected from the data I/O communication I/F 25, sends and receives data for the volumes 2221 and the thin provisioning volumes 224 and writes to them.

A pool management program 2212 manages the pages 2231 in the thin provisioning pools 223, the volumes 2221 as pool volumes, and allocation of the pages 2231 to the thin provisioning volumes 224. A volume management program 2213 manages the volumes 2221 and the thin provisioning volumes 224.

An operation management program 2214 manages operations of the storage system 2 in cooperation with various programs. An operating system 2215 is a platform for executing the various programs and for managing various tables. A storage topology management program 2216 manages topology information on the network connecting the storage system 2 on which the program 2216 runs and the other storage systems 2 (paths between storage system ports).

This network is a network connecting the host computers 3 and the storage systems 2 and is a data network configured with the connection apparatus group 4. The storage system topology management information includes configuration information on the paths between the ports of the storage systems 2; specifically, it includes information on connection apparatus configuration and bandwidth in the paths.

The storage system management information storage part 221 further holds a storage topology management table 200 and a management communication I/F address management table 210. The management communication I/F address management table 210 holds the IP address of the management communication I/F 26. The administrator determines this value when installing the storage system 2 to the computer system.

The storage topology management table 200 includes topology information on the network among the particular storage system 2 and the other storage systems 2. This network includes paths connecting different ports in the same storage system 2. As described above, the storage topology management table 200 stores configuration information on the paths between each port of the particular storage system 2 and the other ports (including the other ports of the same storage system 2).

FIG. 17 illustrates an example of the storage topology management table 200 in a storage system 2. Each storage system 2 has the storage topology management table 200. FIG. 17 exemplifies the storage topology management table 200 in the storage system having the storage ID of ST1.

The storage topology management table 200 has columns of port IDs 2001, opposed storage system IDs 2002, opposed port IDs 2003, minimum bandwidths 2004, the number of transit connection apparatuses 2005, average bandwidth usage rates of the lowest-bandwidth path 2006, peak bandwidth usage rates of the lowest-bandwidth path 2007, and latencies 2008.

The column of port IDs 2001 stores the IDs of the ports in the storage system 2 that owns the table 200. The column of opposed storage system IDs 2002 stores IDs of the opposed storage systems 2 to which the ports identified with the port IDs in the port ID column 2001 are connected. In this example, a volume can be transferred within a single storage pool as described above; accordingly, the storage systems ST2 and ST3 that constitute a single storage pool together with the storage system ST1 are registered in the table 200.

The column of opposed port IDs 2003 stores the IDs of the ports in the opposed storage systems 2 to which the ports identified with the port IDs are connected. The column of minimum bandwidths 2004 stores the minimum value of the bandwidth of the path included in the path between the storage system ports of each entry (each path included in the path between the storage system ports is a part of the path between the storage systems). The column of the number of transit connection apparatuses 2005 stores the number of connection apparatuses in the paths between the storage system ports of the individual entries.

The average bandwidth usage rate of the lowest-bandwidth path and the peak bandwidth usage rate of the lowest-bandwidth path are the same as described in the explanation on the storage topology management threshold table 140 of FIG. 11. The column of latencies 2008 stores values of the latencies between the storage system ports in the individual entries. In the latency column 2008, ">1 ms" means a value less than 1 ms.

In the example of the storage topology management table 200 shown in FIG. 17, the number of connection apparatuses in the path represents the configuration information on each path (entry) and the value of the minimum bandwidth of the path represents the bandwidth information on the path. The average bandwidth usage rate and the peak bandwidth usage rate on the lowest-bandwidth path represent information on the usage of the bandwidth and the latency is included as the information indicating the usage For example, when a storage system 2 is added to the computer system, the storage topology management table 200 in the storage system 2 is created by the storage topology management program 2216. For example, the administrator sets the port IDs, the IDs of the opposed storage systems included in the single storage pool, and the IDs of their ports to the columns of port IDs 2001, opposed storage system IDs 2002, and opposed port IDs 2003, respectively.

The storage topology management program 2216 obtains information to be stored in the columns of the minimum bandwidths 2004, the number of transit connection apparatuses 2005, the average bandwidth usage rates of the lowest-bandwidth path 2006, and the peak bandwidth usage rates of the lowest-bandwidth path 2007 from the connection apparatuses 40 in the connection apparatus group 4. The details of the configuration information on the network held by the connection apparatuses 40 in the connection apparatus group 4 will be described later.

The storage topology management program 2216 updates the values of the usage rates with predetermined timing. When a new storage system 2 is added or when a port of a storage system is connected to/disconnected from a network apparatus, the storage topology management programs 2216 in the other storage systems 2 add/delete the information on the storage system 2 to/from their storage topology management tables 200.

The storage topology management program 2216 can obtain the values to be stored in the latency column 2008 by, for example, a ping command (such as an fcping command) in the network. The storage topology management program 2216 updates the values of the latency column 2008 with predetermined timing.

Figure 18:
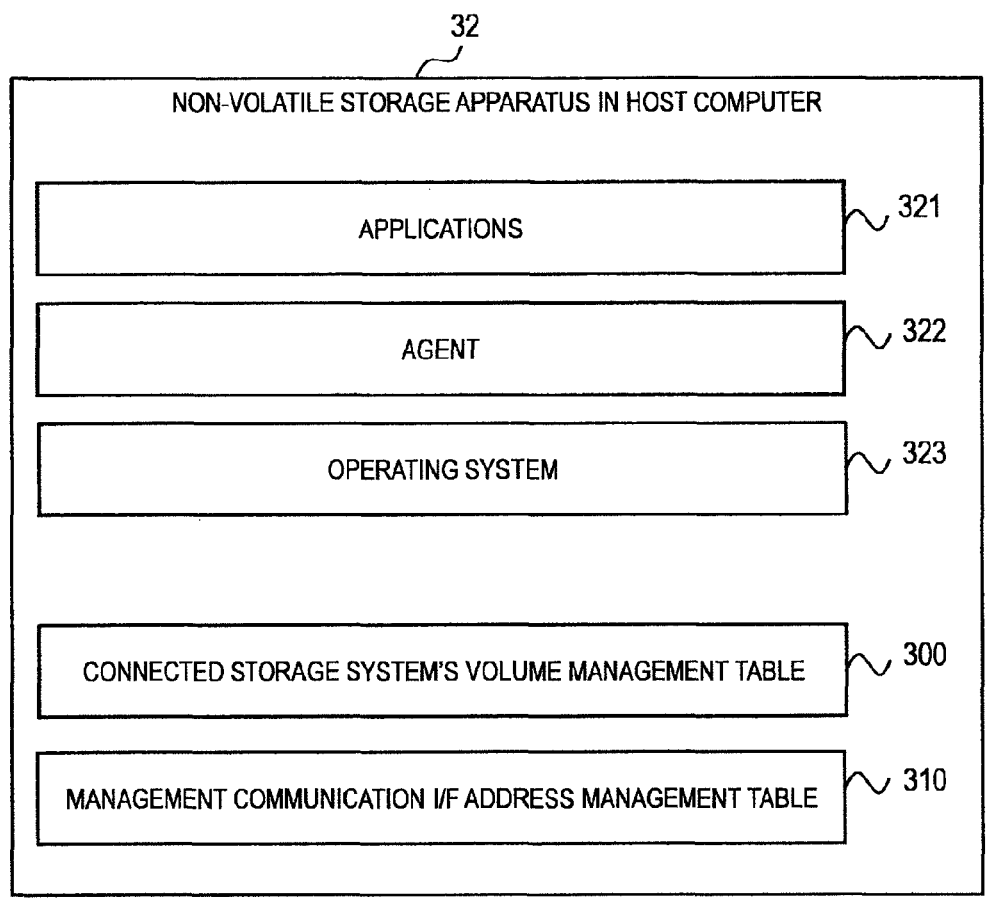
FIG. 18 is a drawing exemplifying information stored in a non-volatile storage apparatus in a host computer in the first embodiment.

FIG. 18 illustrates information stored in the non-volatile storage apparatus 32 in each host computer 3. Applications 321 are programs required for the host computer 3 to provide the functions or services. An agent 322 checks the status of the host computer 3 and specifies configuration information thereon through communication with the host computer management program 123 in the management computer 1. An operating system 323 is a platform for executing various programs in the applications 321 and for managing various tables.

The non-volatile storage apparatus 32 further stores a connected storage system's volume management table 300 and a management communication I/F address management table 310. The management communication I/F address management table 310 stores the IP address of the management communication I/F 36. The administrator sets the value when the host computer 3 is installed in the computer system.

Figure 19:
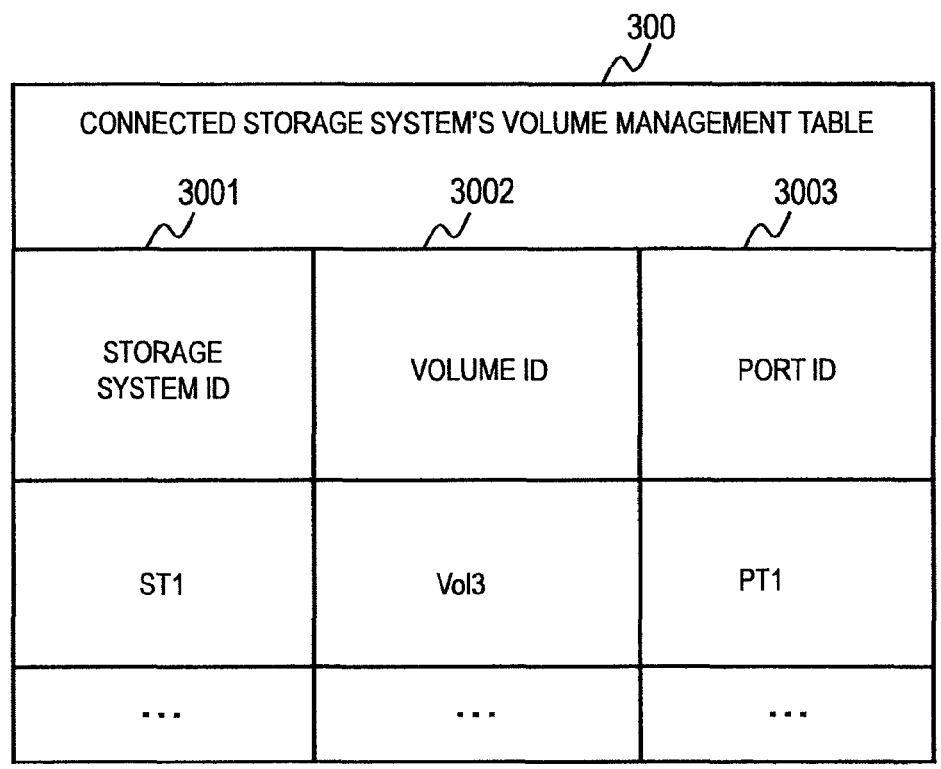
FIG. 19 is a drawing illustrating a configuration example of a connected storage system's volume management table in the host computer in the first embodiment.

FIG. 19 illustrates an example of the connected storage system's volume management table 300 in a host computer 3. The host computer 3 has this table 300, which stores information on volumes which are allocated to and readable or writable from the host computer 3 which owns this table. This table 300 has columns of storage system IDs 3001, volume IDs 3002, and port IDs 3003.

The storage system IDs are the IDs of the storage systems holding such volumes. The volume IDs are the IDs in the individual storage systems 2 of the volumes of the entries. The port IDs are the port IDs in the individual storage systems 2 of the access destinations. The values may be determined by the administrator; otherwise, the agent 322 may store the values received from the management computer 1. The operating system 323 in the host computer 3 accesses the storage systems 2 with reference to the port IDs.

Figure 20:
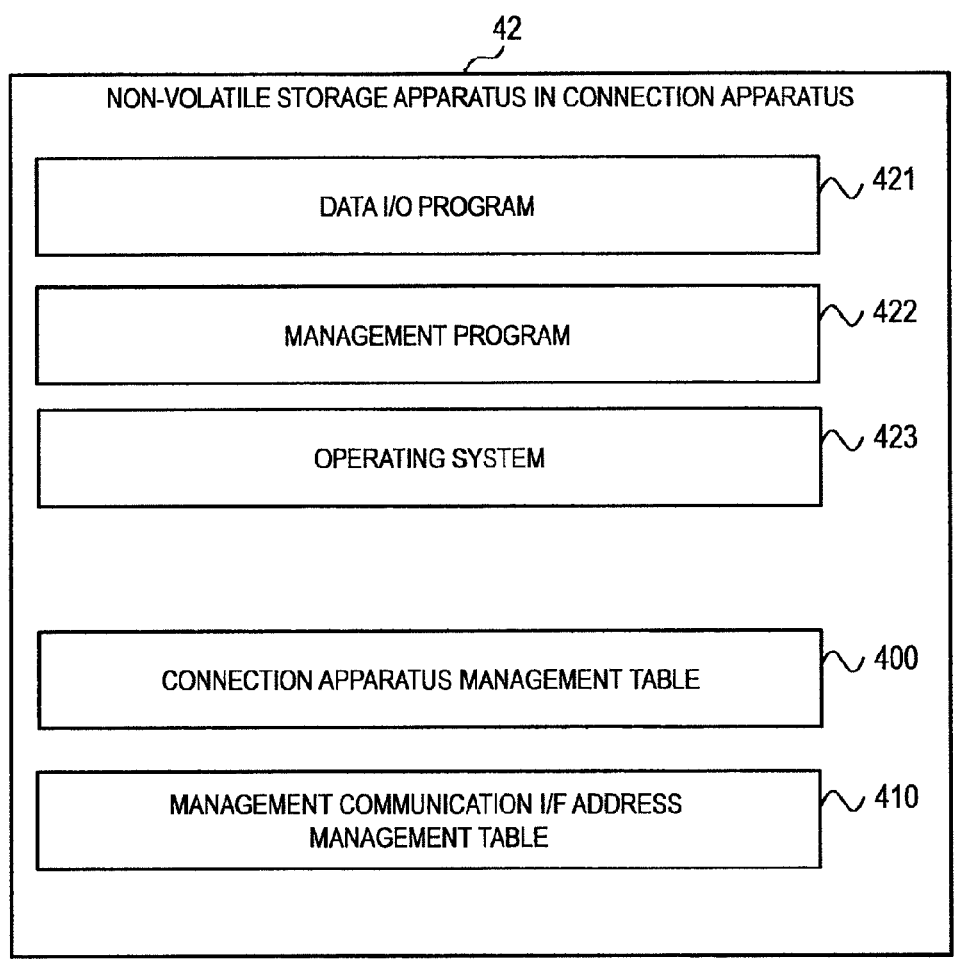
FIG. 20 is a drawing exemplifying information stored in a non-volatile storage apparatus in a connection apparatus in the first embodiment.

FIG. 20 illustrates information stored in the non-volatile storage apparatus 42 in each connection apparatus 40 in the connection apparatus group 4. A data I/O program 421 receives I/O requests from computers and apparatuses in the computer system connected from the data I/O communication I/F 45 and communicates with them with reference to the tables in the non-volatile storage apparatus 42. A management program 422 provides an interface for setting the values in the tables in the non-volatile storage apparatus 42. An operating system 423 is a platform for executing various programs and for managing various tables.

The non-volatile storage apparatus 42 further stores a connection apparatus management table 400 and a management communication I/F address management table 410. The management communication I/F address management table 410 stores the address of the management communication I/F 46. When a connection apparatus is installed in the computer system, the administrator sets the value to this table. The connection apparatuses 5 and 6 have the same programs and tables.

FIG. 21 illustrates a configuration example of the connection apparatus management table 400. The connection apparatus management table 400 manages information on each port of the connection apparatus. Specifically, it stores information on the opposed apparatus and the opposed port to which each port is connected, and the bandwidth and the usage of each port. In this example, the connection apparatus management table 400 has columns of port IDs 4001, opposed apparatus IDs 4002, connected port IDs 4003, physical bandwidths 4004, average amounts of traffic 4005, and the peak amounts of traffic 4006.

The port ID column 4001 stores the IDs of the individual ports of the connection apparatus. The opposed apparatus ID column 4002 stores the IDs of the opposed apparatuses connected from the individual ports. The opposed apparatus connected from a port is a storage system 2, a host computer 3, or a different connection apparatus. In the example of FIG. 21, the IDs of the storage systems 2 and the connection apparatuses are stored in the fields.

The connected port ID column 4003 stores IDs of the ports connected in the opposed apparatuses. The physical bandwidth column 4004 stores values of the bandwidths preset to the individual ports. An average amount of traffic is the average amount of traffic in a predetermined time period, such as one hour, and is expressed in bps in this example. The peak amount of traffic is the largest amount of traffic in the foregoing predetermined time period and expressed in bps in this example.

When a new apparatus is connected to a port of a connection apparatus, the management program 422 in the connection apparatus obtains the values of the IDs of the opposed apparatus and the opposed connected port and stores the obtained IDs in the entry of the connection port in the connection apparatus management table 400. The values of the physical bandwidths are predetermined to the individual ports. The data I/O program 421 measures the amount of traffic at each port and updates the values of the columns of average amounts of traffic 4005 and peak amounts of traffic 4006 in the connection apparatus management table 400 with predetermined intervals.

As previously described, the storage topology management program 2216 in a storage system 2 queries each connection apparatus in the connection apparatus group 4 about the information for the storage topology management table 200. The management program 422 that has received the query from the storage system 2 obtains required information from the connection apparatus management table 400 to transmit it to the storage system 2.

For example, when a storage system 2 is newly connected to a connection apparatus, the storage topology management program 2216 requests each connection apparatus 40 in the connection apparatus group 4 to send configuration information indicating the connection conditions to the network. In response to the request, each connection apparatus 40 transmits all information held in the connection apparatus management table 400, namely, the values held in the columns 4001 to 4006, to the storage system 2 of the query source.

The storage topology management program 2216 can obtain values to be stored in the columns of the storage topology management table 200 from the information obtained from the connection apparatuses 40 in the connection apparatus group 4. For example, the storage topology management program 2216 can ascertain the transit connection apparatuses between the port of the storage system 2 and the opposed port and the transit ports thereof from the relationship between the ports of the connection apparatuses 40 and the connected ports therefrom.

The storage topology management program 2216 can obtain the value of the number of transit connection apparatuses in a path between storage system ports from the connection apparatus configuration of the path. Moreover, as the ports of the connection apparatuses 40 in the path are ascertained, the storage topology management program 2216 can obtain the value of the minimum bandwidth of the path from the values of the physical bandwidths of the ports in the path.

The storage topology management program 2216 can determine the minimum value in the values of the physical bandwidths for the ports in the path to be the value of the minimum bandwidth of the path. In the case where a plurality of ports are joined to form one physical port, the physical bandwidth of the united port which consists of the plurality of ports is referred to in determining the minimum bandwidth of the path.

The storage topology management program 2216 can calculate the average bandwidth usage rate and the peak bandwidth usage rate of the lowest-bandwidth path between two storage ports from the average amount of traffic and the peak amount of traffic in the connection apparatus management table 400. To update these values only, the storage topology management program 2216 requests the values of the average amount of traffic and the peak amount of traffic to the connection apparatus in the lowest-bandwidth path in each path between two storage ports and updates the average bandwidth usage rates and the peak bandwidth usage rates using the obtained values.

Figure 22:
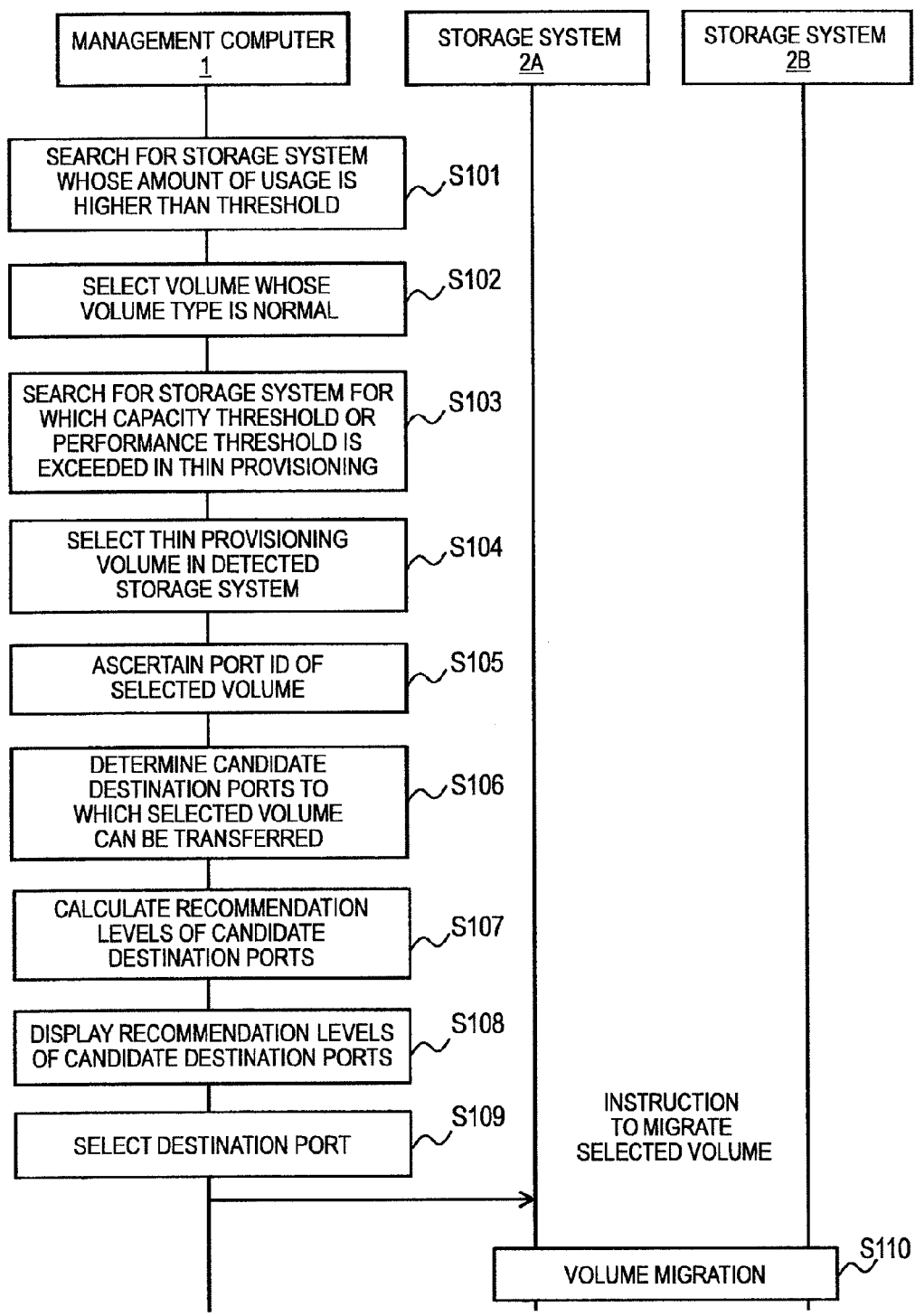
FIG. 22 is a sequence diagram illustrating an example of a volume migration in the first embodiment.

Now, with reference to the flowchart of FIG. 22, an example of a process to select a volume to be transferred and a destination of the volume for resource leveling in a computer system will be described. In this example, the management computer 1 selects candidate volumes to be transferred based on the usage of storage systems 2 and, further, calculates recommendation levels of destination ports of the volumes based on the paths between two storage system ports. The administrator can decide the destination of the volume with reference to this recommendation level. In this example, the candidate destination ports for a volume of which recommendation levels are calculated are the ports of the storage systems 2 different from the current storage system 2.

The operation management program 124 in the management computer 1 searches for a volume for migration. Specifically, it refers to the storage system usage management table 160 and searches for an entry with which the rate of the value of the field in the amount of usage column 1604 to the value of the field in the total capacity column 1602 is higher than the value of the field in the capacity threshold column 1603 with respect to each field in the storage system ID column 1601 (S101).

If there exists any storage system 2 in which the rate of the amount of usage is higher than the capacity threshold, the operation management program 124 searches the storage system ID column 1505 in the volume management table 150 for the entries of the storage system ID. The operation management program 124 selects a volume from the volumes whose values in the volume type column 1504 are normal in the volumes of the matching entries as a migration volume (S102). The storage system management program 121 selects a volume, for example, whose amount of usage is largest.

Next, the operation management program 124 selects a volume for migration from the volumes for thin provisioning. The operation management program 124 refers to the thin provisioning pool usage management table 170 and searches for the storage system ID of an entry whose rate of the value of the field in the amount of usage column 1706 to the value of the field in the capacity column 1705 is higher than the value of the field of the capacity threshold column 1707. In addition, the operation management program 124 searches for a storage system ID of an entry whose value of the field of the TOPS column 1708 is higher than the value of the field of the performance threshold column 1709 (S103).

Next, the operation management program 124 refers to the volume management table 150 and searches the storage system ID column 1505 for the entries of the storage system with which is determined at step S103 the amount of usage or the IOPS is higher than their respective thresholds. Among the volumes (entries) in the storage system, it selects a volume from the entries whose values in the volume type column 1504 are thin provisioning as a migration volume (S104). The storage system management program 121 selects a volume, for example, whose amount of usage is largest. It should be noted that selections from the volumes adapted to thin provisioning and the other normal volumes are carried out in a series of processing of this flow; however, either the steps S101 and S102 or the steps S103 and S104 may be selected to be carried out.

Next, the operation management program 124 refers to the port ID column 1507 of the entry of the selected volume in the volume management table 150 to ascertain the port ID of the volume (S105).

Furthermore, the operation management program 124 determines the ports to which the selected volume can be transferred from the port ID of the volume (S106). In this example, the operation management program 124 selects the ports that are in the single storage pool the port of the selected volume belonging to, and in addition, that are the ports in other storage systems 2 having remaining capacities enough to store the selected volume, as the ports to which the selected volume can be transferred.

The operation management program 124 can ascertain the single storage pool the port of the volume to be transferred belonging to, and the other storage systems and the ports included therein with reference to the transfer range management table 130.

For example, the operation management program 124 determines candidate destination storage systems 2 (ports) for a normal type of volume with reference to the storage system usage management table 160 and determines candidate destination storage systems 2 (ports) for a thin provisioning volume with reference to the thin provisioning pool usage management table 170.

The operation management program 124 can ascertain the capacity and the amount of usage of a storage system with reference to the storage system usage management table 160 and can ascertain the capacities and the amounts of usage of the storage systems in a thin provisioning pool with reference to the thin provisioning pool usage management table 170. The destination of a thin provisioning volume may be limited to the storage systems that provide the same thin provisioning pool with storage areas or may be other thin provisioning pools.

Next, the operation management program 124 calculates recommendation levels of the determined candidate destination ports (S107). The details of the calculation method of a recommendation level will be described later with reference to FIG. 23. If a plurality of volumes have been selected, the operation management program 124 calculates the recommendation level of each volume. The storage system management program 121 stores the calculated recommended levels in the destination recommendation level table 180. Moreover, the operation management program 124 outputs information including the recommendation levels obtained from the destination recommendation level table 180 to the image output apparatus 18 (S108).

For example, the image output apparatus 18 displays a table having the same contents as the destination recommendation level table 180. In the case of a thin provisioning volume, the operation management program 124 may also display information on the current thin provisioning pool and the candidate destination thin provisioning pools.

The administrator selects a port to which the volume is transferred with the input apparatus 19 with reference to the displayed candidate destination ports and their recommendation levels (S109). The operation management program 124 determines the port selected by the administrator to be the destination port for the volume and instructs the source storage system and/or the destination storage system to migrate the volume. In the example of FIG. 22, the storage system 2A is the source and the storage system 2B is the destination for the volume migration.

The storage systems 2A and 2B performs migration of the selected volume from the storage system 2A which includes the selected volume to the storage system 2B of the selected migration destination (S110). The storage system management program 121 instructs the storage system 2B to transfer the volume. The volume management program 2213 in the storage system 2B requests transfer of (the data in) the specified volume to the storage system 2A.

The volume management programs 2213 in the storage systems 2A and 213 transfer the data in the target volume in the storage system 2A to a volume in the storage system 2B. Moreover, the volume management programs 2213 in the storage systems 2A and 2B update their respective management information on the volumes (not shown). When the operation management program 124 in the management computer 1 receives a completion notice of the migration of the specified volume, it updates the relevant entries of the volume management table 150.

The foregoing flow enables a more appropriate destination port to be selected in transferring a volume with consideration of the performance of volumes in access via a network. Since the recommendation levels of the candidate destinations are calculated based on the paths between storage system ports, the recommendation levels can be obtained even in a system which does not manage connection information on the host computers 3.

In the foregoing example, the management system automatically selects a volume to be transferred, but the administrator may specify the volume to be transferred. The candidate volume destination ports of which the recommendation levels are calculated can include the ports of the current storage system 2 which includes the volume. The management computer 1 executes the foregoing flow with respect to the specified volume. The management system may determine the destination port depending on the recommendation level without presenting the administrator the recommendation levels of the candidate destination ports.

Next, with reference to the flowchart of FIG. 23, a method of calculating a recommendation level of a candidate destination port will be described. As explained with reference to FIG. 22, the operation management program 124 calculates recommendation levels of the ports selected as candidate destinations (S107). The storage system management program 121 calculates a recommendation level based on the configuration (connection apparatus configuration and bandwidth) and usage of the path between the source port and the destination port. The operation management program 124 executes the flow of FIG. 23 for each of the candidate destination ports.

Figure 23:
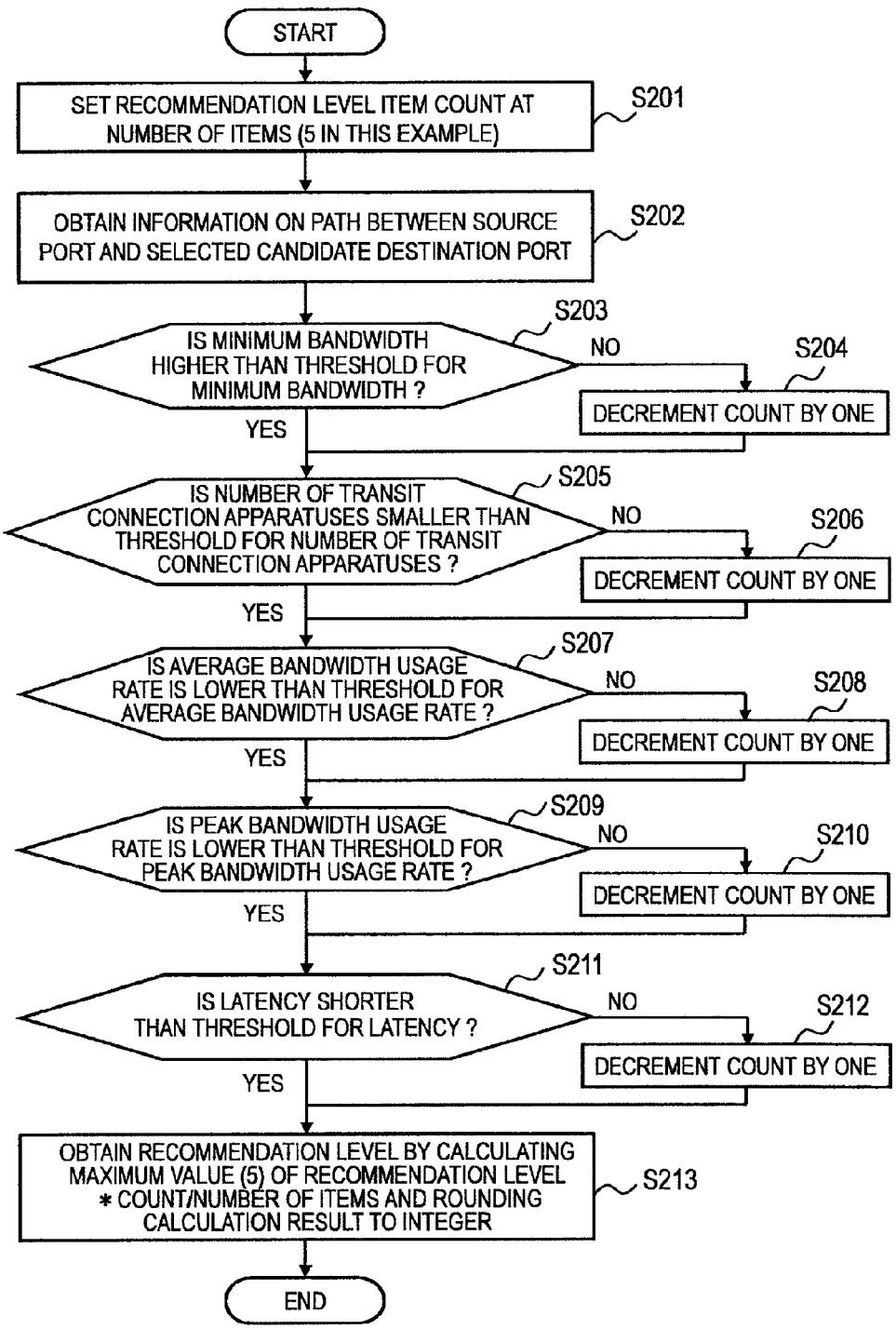
FIG. 23 is a flowchart illustrating an example of a method of calculating a recommendation level of a candidate destination port in the first embodiment.

In the flowchart of FIG. 23, the operation management program 124 sets recommendation level item count at the number of items (S201). In this example, the number of items is 5. Next, the operation management program 124 selects a candidate destination port whose recommendation level is to be calculated, obtains information on the entries of the source port and the selected candidate destination port for the volume in the storage topology management table 200 from the storage system 2 of the volume transfer source, and stores it in the cache memory 11 or the non-volatile storage apparatus (S202).

The operation management program 124 compares the values obtained from the storage topology management table 200 with the thresholds held in the storage topology management threshold table 140 and calculates the recommendation level. Specifically, the operation management program 124 compares the value of the minimum bandwidth of the path with the threshold for minimum bandwidth (S203). If the value of the minimum bandwidth is equal to or lower than the threshold (NO at S203), the operation management program 124 decrements the count by one (S204). If the value of the minimum bandwidth is higher than the threshold (YES at S203), the count is maintained.

Next, the storage system management program 121 compares the value of the number of transit connection apparatuses in the path with the threshold for the number of transit connection apparatuses (S205). If the value of the number of transit connection apparatuses is equal to or higher than the threshold (NO at S205), the operation management program 124 decrements the count by one (S206). If the value of the number of transit connection apparatuses is lower than the threshold (YES at S205), the count is maintained.

Next, the operation management program 124 compares the value of the average usage rate of the lowest-bandwidth path in the path with the threshold for average bandwidth usage rate (S207). If the value of the average bandwidth usage rate is equal to or higher than the threshold (NO at S207), the storage system management program 121 decrements the count by one (S208). If the value of the average bandwidth usage rate is lower than the threshold (YES at S207), the count is maintained.

Next, the operation management program 124 compares the value of the peak bandwidth usage rate of the lowest-bandwidth path in the path with the threshold for the peak bandwidth usage rate (S209). If the value of the peak bandwidth usage rate is equal to or higher than the threshold (NO at S209), the operation management program 124 decrements the count by one (S210). If the value of the peak bandwidth usage rate is lower than the threshold (YES at S209), the count is maintained.

Next, the operation management program 124 compares the value of the latency in the path with the threshold for latency (S211). If the value of the latency is equal to or higher than the threshold (NO at S211), the operation management program 124 decrements the count by one (S212). If the value of the latency is lower than the threshold (YES at S211), the count is maintained.

Finally, the operation management program 124 substitutes the value of the count to a predetermined formula to obtain a recommendation level (S213). In an example, the calculation of the recommendation level divides the product of the highest value of the recommendation level (five in this example) by the count by the number of items and rounds the result to an integer. The operation management program 124 stores this value in the transfer recommendation level table 180 as the value of the recommendation level of this path.

This example calculates the recommendation level of a destination port based on the configuration and usage of the path between the storage system ports. In a network among host storages, selection of a new location (port) close to the current volume location (port) in the network achieves a selection of a volume location where the access performance from the host computer 3 is less changed.

The foregoing method of calculating the recommendation level is merely an example and the operation management program 124 can calculate the recommendation level in consideration of the above-described items using a different method. The operation management program 124 may calculate the recommendation level with reference to only part of the above-described five items. For example, the operation management program 124 may calculate the recommendation level only from the item of the minimum bandwidth, or from the minimum bandwidth and the number of transit connection apparatuses.

The items may be separately weighted and the count may be decremented differently depending on the item. For example, the greatest weighting factor may be given to the minimum bandwidth and the number of transit connection apparatuses, the second greatest weighing factor may be given to the average bandwidth usage rate and the peak bandwidth usage rate, and the smallest weighing factor may be given to the latency. The operation management program 124 may refer to other items different from the above-described five items. In the foregoing example, each item has one threshold, but the operation management program 124 may use a plurality of thresholds for each item. For example, the operation management program 124 may use different thresholds depending on the volume, the path, or the storage system.

In the above-described configuration example, the management computer 1 has the storage topology threshold table 210. Each storage system 2 may have a storage topology threshold table 210 for its own storage system and transmits the thresholds to the management computer 1 in response to a request from the management computer 1.

The above-described example has five recommendation levels; however, the number of levels may be any value not less than two. For example, in the case where two recommendation levels are defined, if any one of the five items is negative (in a state to decrement the count), the recommendation level may be low; otherwise, if all the items are positive, the recommendation level may be high.

The management computer 1 may obtain information held in the storage topology management table 200 from each storage system 2, and create and hold a storage topology management table to be referred to by the management computer itself for the above-described processing and other processing. Such a storage topology management table is a table obtained by unifying the storage topology management tables 200 of all the storage systems 2. The management computer 1 obtains update information from each storage system 2 in response to a predetermined event to update its own storage topology management table. The same applies to the later-described host topology management table.

Next, with reference to FIG. 24, an example of updating (creating) the storage topology management table 200 will be explained. The sequence diagram of FIG. 24 illustrates an example of updating (creating) a storage topology management table 200 in response to installment of a new storage system in the computer system.

Figure 24:
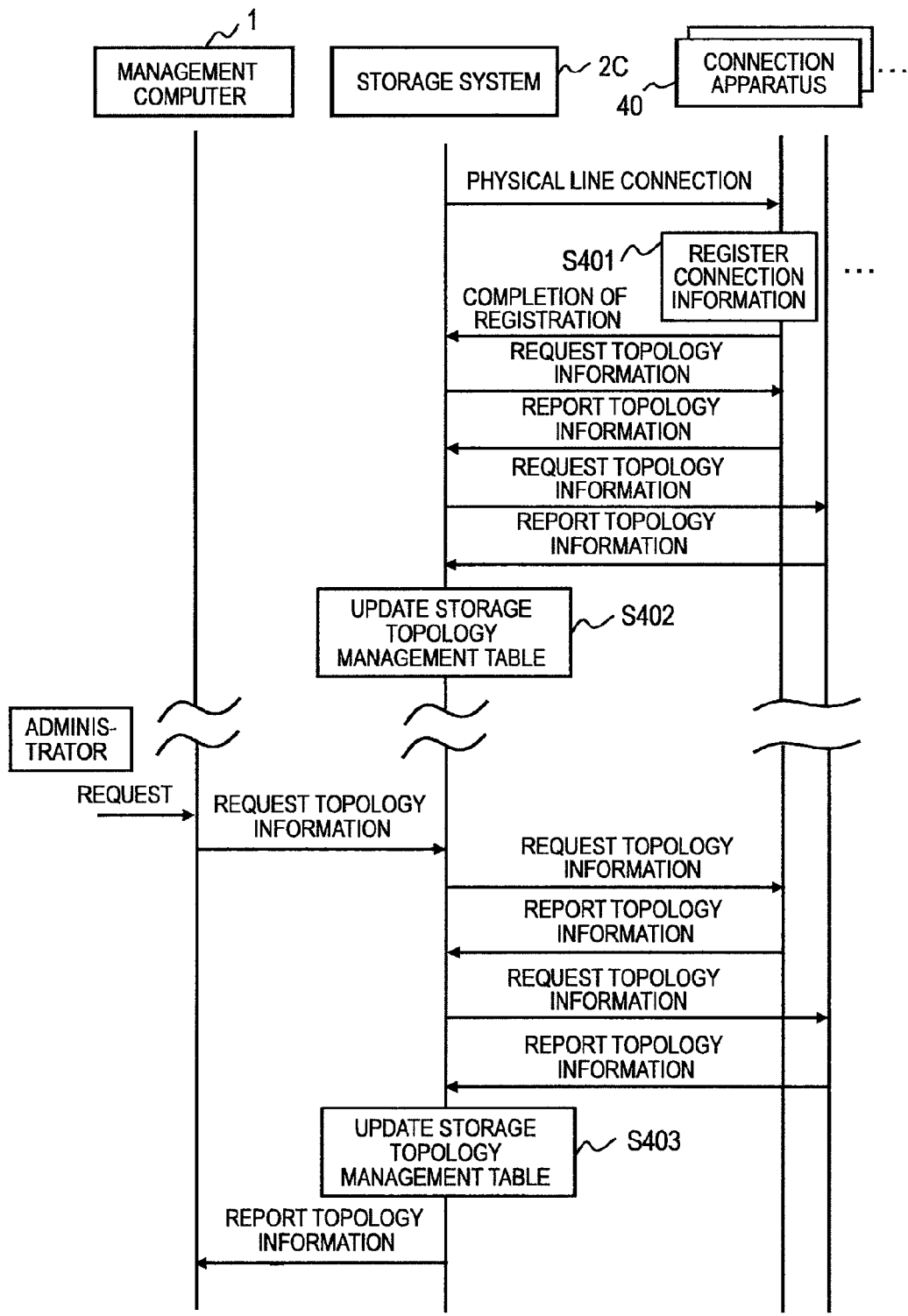
FIG. 24 is a sequence diagram illustrating an example of updating the storage topology management table in the first embodiment.

In FIG. 24, first, a port of a new storage system 2C is connected to a port of a connection apparatus 40. The management program 422 of the connection apparatus 40 to which the storage system 2C has been newly connected obtains the IDs of the storage system 2C and the connection port with negotiation of the operation management program 2214 of the storage system 2C and adds them to the connection apparatus management table 400 (S401). In the case where a plurality of ports of the storage system 2C are connected to separate connection apparatuses 40, the individual connection apparatuses 40 register the information in the respective connected apparatus management tables 400.

Upon completion of the registration in the connection apparatus management table 400, the management program 422 in the connection apparatus 40 notifies the storage system 2C of the completion. The operation management program 2214 of the storage system 2C requests topology information to each connection apparatus 40 in the connection apparatus group 4. The topology information is information included in the connection apparatus management table 400. The operation management program 2214 obtains all information included in the connection apparatus management table 400 from each connection apparatus 40 in the connection apparatus group 4.

The operation management program 2214 in the connected storage system 2C updates the storage topology management table 200 with the obtained information (S402). In this example, updating means storing new data. The operation management program 2214 obtains values in the columns 2004 to 2007 in the storage topology management table 200 from the information obtained from the connection apparatuses 40 in the connection apparatus group 4 and stores them. The operation management program 2214 further measures latencies in the paths and stores them in the latency column 2008.

Although not shown in FIG. 24, the other storage systems 2 obtain information on the storage system 2C, namely, information on the connection port of the storage system 2C, from the connection apparatus 40 connected from the port of the storage system 2C periodically or in response to an instruction from the management computer 1 or a configuration change in physical line connection, and update their storage topology management tables 200.

For example, upon receipt of a request for volume migration, the operation management program 124 in the management computer 1 requests topology information on the paths between the storage system port of the particular volume and other storage system ports, to the storage system 2 of the particular volume, the storage system 2C in this example, to calculate the recommendation levels. The topology information is information on the paths held in the storage topology management table 200.

In response to the request from the management computer 1, the operation management program 2214 in the storage system 2C requests update information for the topology information (information in the connection apparatus management table 400) to each connection apparatus 40. The update information is, for example, information on the update of the apparatuses or the ports opposed to the port or the updated measured amounts of traffic.

The operation management program 2214 updates its own storage topology management table 200 with the update information obtained from the connection apparatuses 40 (S403) and transmits the topology information obtained from the storage topology management table 200 to the management computer 1. The operation management program 124 in the management computer 1 calculates the recommendation levels of the paths (destination ports) using the obtained path information.

The foregoing example refers to the minimum bandwidth in calculating a recommendation level. The method of calculating a recommendation level in this embodiment may refer to different information on the bandwidth of the path. For example, the management computer 1 refers to the average bandwidth of the path to determine the recommendation level.

As described above, the management computer 1 may hold and manage a table for managing the storage topology. The storage system management program 121 receives all information or updated information for the storage topology management table 200 from each storage system 2. The storage system management program 121 creates or updates the storage topology management table using the received information.

In the foregoing example, the management computer 1 collects information on the storage topology via the storage system 2. The management computer 1 may collect information on the storage topology directly from the connection apparatuses 40. For example, the management computer 1 may obtain information on latency in the storage topology management table 200 from the storage system 2 and the other information from the connection apparatuses 40. The explanation on other methods of calculating the recommendation level applies to the other embodiments which will be described hereinafter.

The foregoing example calculates recommendation levels of candidate destination ports in live volume-migration. The candidate volume location ports whose recommendation levels are calculated are not limited to candidate destination ports for an existing volume and may be a candidate port to locate a volume to be newly created.

Second Embodiment

Hereinafter, a second embodiment of this invention will be explained. The second embodiment calculates the recommendation level of a destination port based on the amount of I/O of the volume to be transferred and the usage of the path. This embodiment enables an appropriate destination port to be selected depending on the access condition of the volume to be transferred. In the following description, points in the second embodiment different from the first embodiment will be mainly explained.

Figure 25:
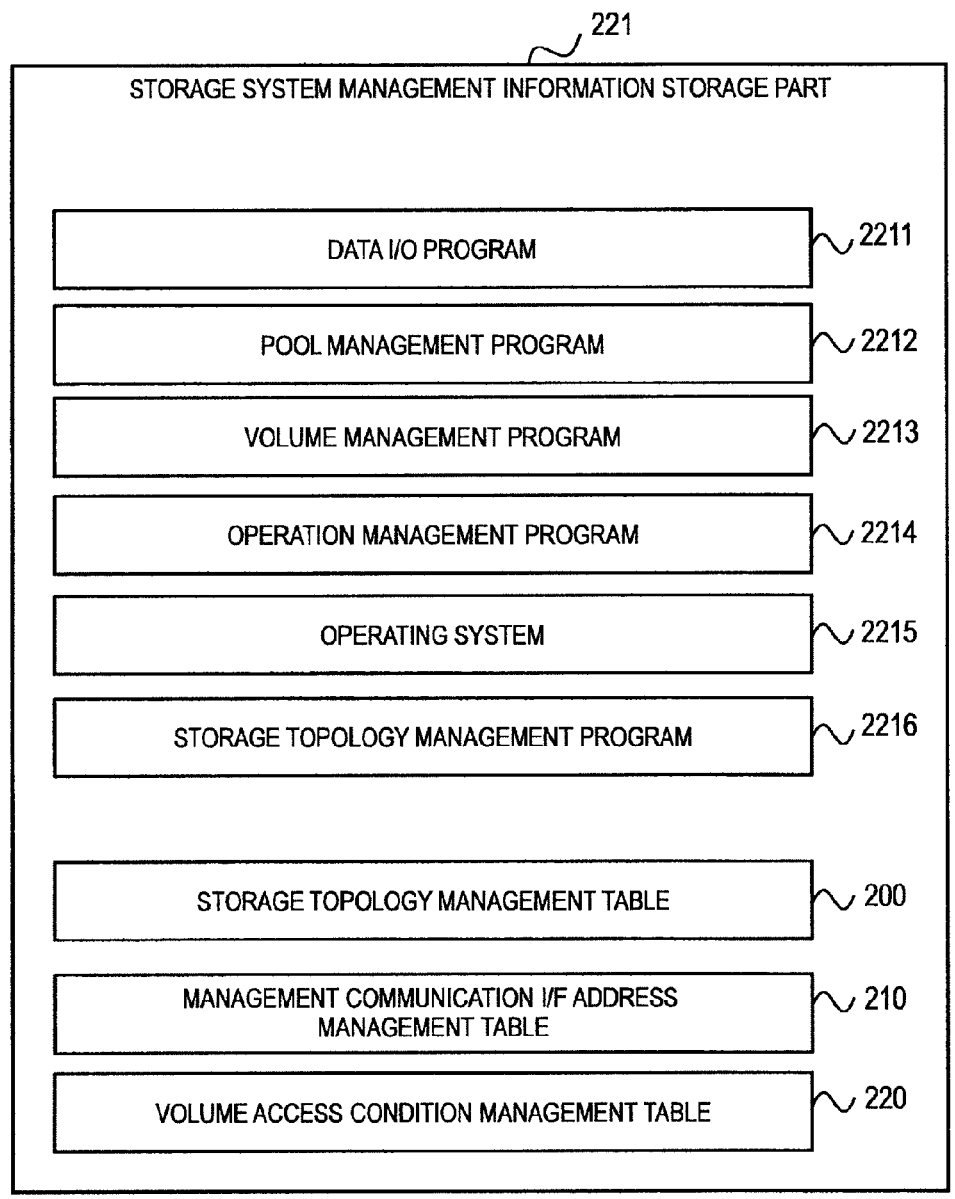
FIG. 25 is a drawing exemplifying information stored in a management information storage part in a storage system in the second embodiment.

FIG. 25 illustrates information included in the storage system management information storage part 221 in the second embodiment. As a point different from the first embodiment, a volume access condition management table 220 is added. The volume access condition management table 220 is a table for managing conditions of access to each volume.

FIG. 26 illustrates a configuration example of the volume access condition management table 220. The volume access condition management table 220 has columns of port IDs 2201, volume IDs 2202, average bandwidths used in volume access 2203, and peak bandwidths used in volume access 2205. The port Ds and the volume IDs are the same as explained in the first embodiment; the volume ID column 2202 indicates the volumes connected from the ports identified with the port IDs.

The average bandwidth and the peak bandwidth used in volume access are values representing the amount of I/O of the volume. The average bandwidth used in volume access is an average value of the bandwidth used in accessing a volume in a predetermined time (for example, one hour). The peak bandwidth used in volume access is the maximum value of the bandwidth used in accessing a volume in the abovementioned predetermined time. In this example, these are expressed in bps. The data I/O program 2211 in each storage system 2 measures these values on each volume and updates the values in the volume access condition management table 220 with the predetermined time intervals.

Figure 27A:
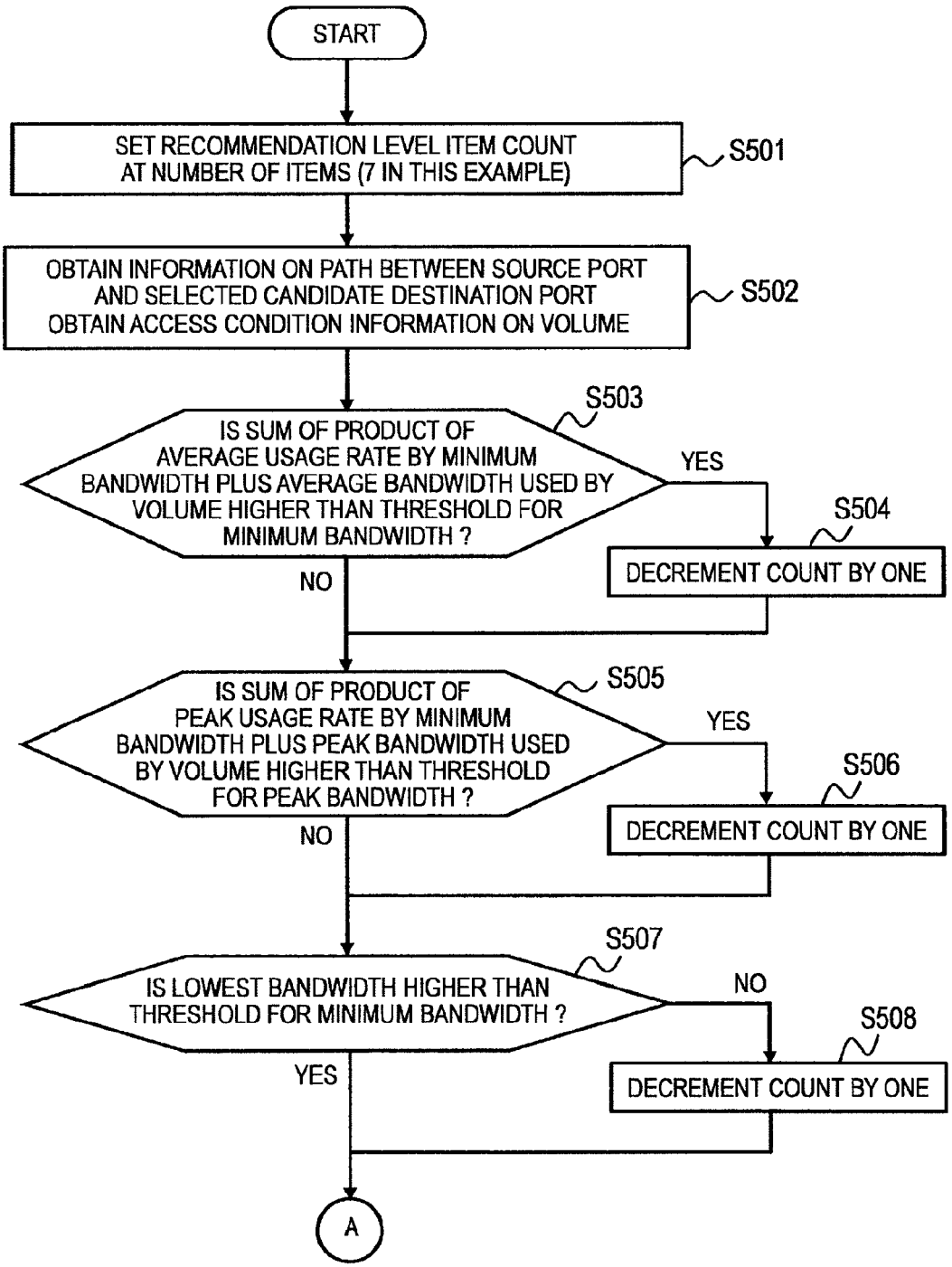
FIG. 27A is a drawing showing a part of a flowchart illustrating an example of a method of calculating a recommendation level of a candidate destination port in the second embodiment.
Figure 27B:
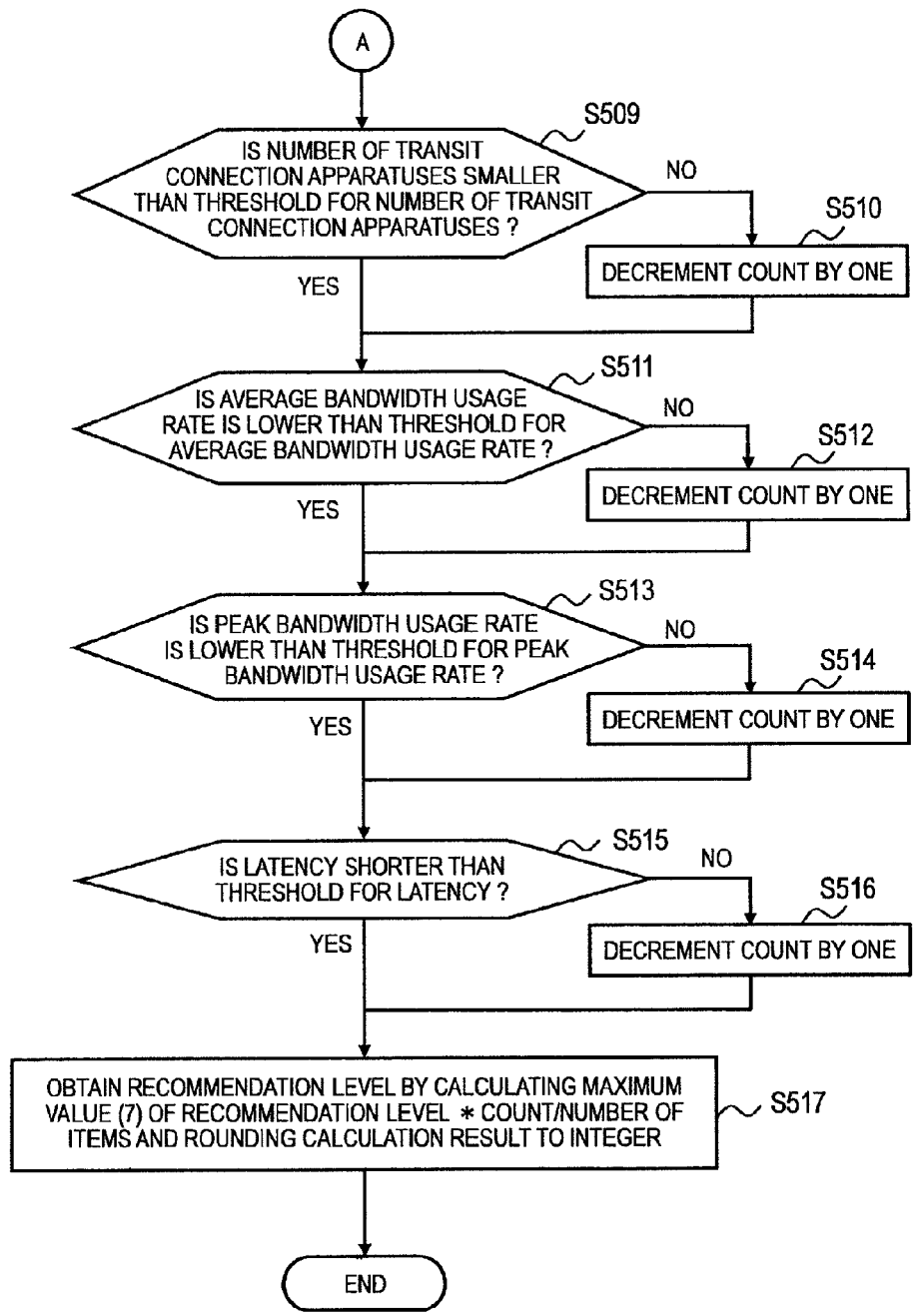
FIG. 27B is a drawing showing the other part of the flowchart illustrating an example of a method of calculating a recommendation level of a candidate destination port in the second embodiment.

With reference to the flowcharts of FIGS. 27A and 27B, a method of determining a recommendation level in the second embodiment will be explained. FIGS. 27A and 27B are part of a flowchart and they are joined by the connector A. In the following description, points different from the flowchart of FIG. 23 in the first embodiment will be mainly explained.

First, the operation management program 124 of the management computer 1 sets the recommendation level item count at the number of items (S501). In this example, the number of items is seven.

Next, the operation management program 124 selects a candidate destination port whose recommendation level is to be calculated and obtains information on the entries of the source port for the volume to be transferred and the selected candidate destination port in the storage topology management table 200 from the storage system 2 of the volume transfer source. Moreover, the operation management program 124 obtains information on access condition of the volume to be transferred from the storage system 2 the volume belonging to. Specifically, the operation management program 124 obtains the values of the average bandwidth and the peak bandwidth used in volume access held in the volume access condition management table 220 (S502).

The operation management program 124 calculates a product of the value of the average bandwidth usage rate by the value of the minimum bandwidth in the path, and calculates the sum of the obtained product and the value of the average bandwidth used in the volume access. The operation management program 124 compares the obtained sum with the threshold for the minimum bandwidth for the path (S503). The threshold for the minimum bandwidth is a product of the value of the minimum bandwidth by the average bandwidth usage rate. The threshold table 140 may store a threshold for the minimum bandwidth different from this.

If the obtained sum is higher than the threshold for the minimum bandwidth (YES at S503), the operation management program 124 decrements the count by one (S504). If the obtained sum is equal to or lower than the threshold for the minimum bandwidth (NO at S503), the count is maintained.

The operation management program 124 calculates the product of the peak bandwidth usage rate by the value of the minimum bandwidth in the path, and calculates the sum of the obtained product and the value of the peak bandwidth used in volume access. The operation management program 124 compares the obtained sum with a threshold for the peak bandwidth (S505). The threshold for the peak bandwidth is the product of the value of the minimum bandwidth by the threshold for peak bandwidth usage rate. The threshold table 140 may store information for a threshold for the peak bandwidth different from this.

If the obtained sum is higher than the threshold for the peak bandwidth (YES at S505), the operation management program 124 decrements the counter by one (S506). If the obtained sum is equal to or lower than the threshold for the peak bandwidth (NO at S505), the count is maintained.

The steps S507 to S516 in the flowchart of FIGS. 27A and 27B are the same as the steps S203 to S212 in the flowchart of FIG. 23; accordingly, explanation is omitted. At step S517 in FIG. 27B, the operation management program 124 calculates the recommendation level using a predetermined formula. The formula is the same as the one in the first embodiment (step S213 in FIG. 23). However, in the second embodiment, the number of items is seven; the maximum value for the recommendation level is seven.

This embodiment calculates the recommendation level considering the effect caused by additional amount of I/O for the volume to be transferred on the current condition of use (specified by the average bandwidth and the peak bandwidth used in volume access in the foregoing example) for the path. This calculation enables selection of a more appropriate destination port in accordance with the I/O characteristics of the volume.

This example adds two items representing the access condition on the volume to the items in the first embodiment. Like in the first embodiment, the operation management program 124 can calculate the recommendation level by a method different from this. For example, the operation management program 124 may use either one of the two items representing the access condition on the volume; otherwise, it may refer to a part of the other five items or does not need to refer to any of them.

Third Embodiment

Hereinafter, a third embodiment of this invention will be explained. The third embodiment determines the priority level of a port to locate a virtual machine (a port of a host computer 3) based on the topology of the data communication network (a SAN in the foregoing examples) among the host computers 3 and the storage systems 2.

Unlike the first embodiment that calculates recommendation levels (priority levels) of the paths between storage systems, the third embodiment calculates recommendation levels (priority levels) of destinations of a virtual machine based on the configuration and usage of the paths between a host computer 3 and storage systems 2. The third embodiment also calculates the recommendation levels (priority levels) of destination ports for a volume based on the configuration (connection apparatus configuration and bandwidth) and usage of the paths between the host computer 3 and the storage systems 2.

In the third embodiment, one or more virtual machines run on a host computer 3. Host computers 3 individually execute virtualization software; the virtual machines run on the virtualization software. A virtual machine is software (a program) and includes an OS (Operating System) in addition to the configuration information on the virtual machine. For example, a virtual machine is a virtual server and includes application programs for the virtual server and data for the programs to operate, in addition to the OS.

Figure 28:
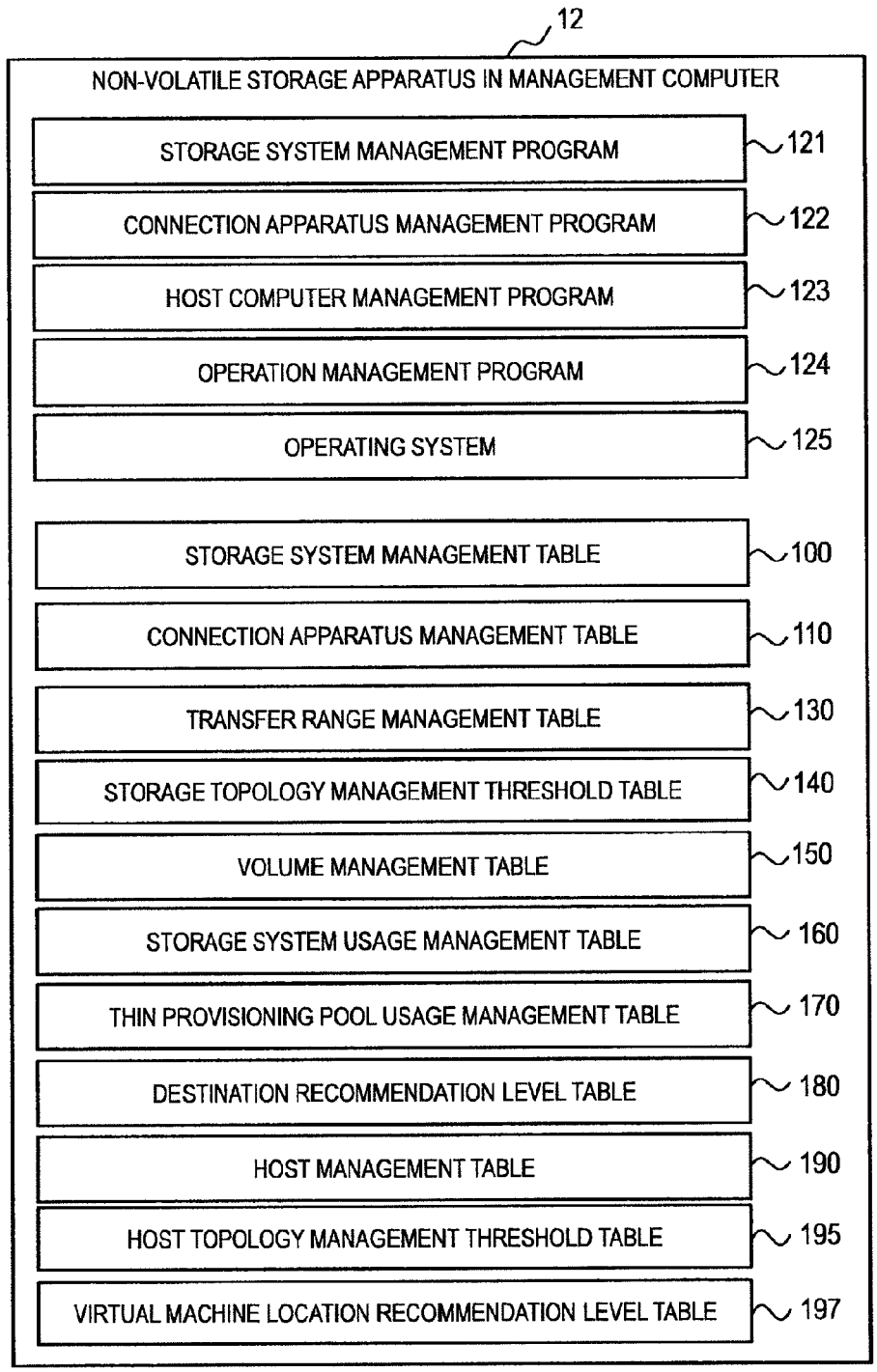
FIG. 28 is a drawing exemplifying information stored in a non-volatile storage apparatus in a management computer in the third embodiment.

FIG. 28 illustrates information held in the non-volatile storage apparatus 12 in the management computer 1. The points differing from the first embodiment are that a host management table 190, a host topology management threshold table 195, and a virtual machine location recommendation level table 197 are added. The host management table 190 is a table for managing the host computers 3 in the computer system. The virtual machine location recommendation level table 197 is a table for managing recommendation levels of ports to locate virtual machines. As will be described later, the transfer range management table 130 additionally includes information defining the ports to which virtual machines can be transferred.

FIG. 29 is a configuration example of the host management table 190. The host management table 190 has columns of host IDs 1901, management port IP addresses 1902, amounts of memory installed 1903, amounts of memory usage 1904, the number of CPU cores 1905, CPU frequencies 1906, CPU usage rates 1907, and port IDs 1908. The host management table 190 includes information on the configuration, performance, and usage of the host computers 3.

The host IDs are identifies to uniquely identify the host computers 3 in the computer system; the management computer 1 can communicate with a host computer 3 by the management port IP address of the host computer 3. As to the values other than the memory usages and the CPU usages, the administrator registers them when a host computer 3 is installed in the computer system. The memory means the main memory of a host computer 3 and the port ID column 1908 stores the identifiers of the ports of individual host computers 3.

For example, an agent 322 periodically obtains the memory usage and the CPU usage of the host computer 3 on which the agent 322 operates and transmits those values to the management computer 1 in response to a request therefrom. The host computer management program 123 of the management computer 1 stores the values of the memory usage and the CPU usage obtained in a given period or the average values thereof for a plurality of periods in the amount of memory usage column 1904 and the CPU usage rate column 1907, respectively, in the host management table 190.

FIG. 30 illustrates a configuration example of the host topology management threshold table 195. The host topology management threshold table 195 has columns of thresholds for minimum bandwidth 1951, thresholds for the number of transit connection apparatuses 1952, thresholds for average bandwidth usage rate of the lowest-bandwidth path 1953, thresholds for peak bandwidth usage rate of the lowest-bandwidth path 1954, and thresholds for latency 1955.

The configuration of the host topology management threshold table 195 is the same as that of the storage topology management threshold table 140. The host topology management threshold table 195 differs from the storage topology management threshold table 140 in storing the thresholds for the paths between the ports of each host computer 3 and the ports of each storage system 2.

Figure 31:
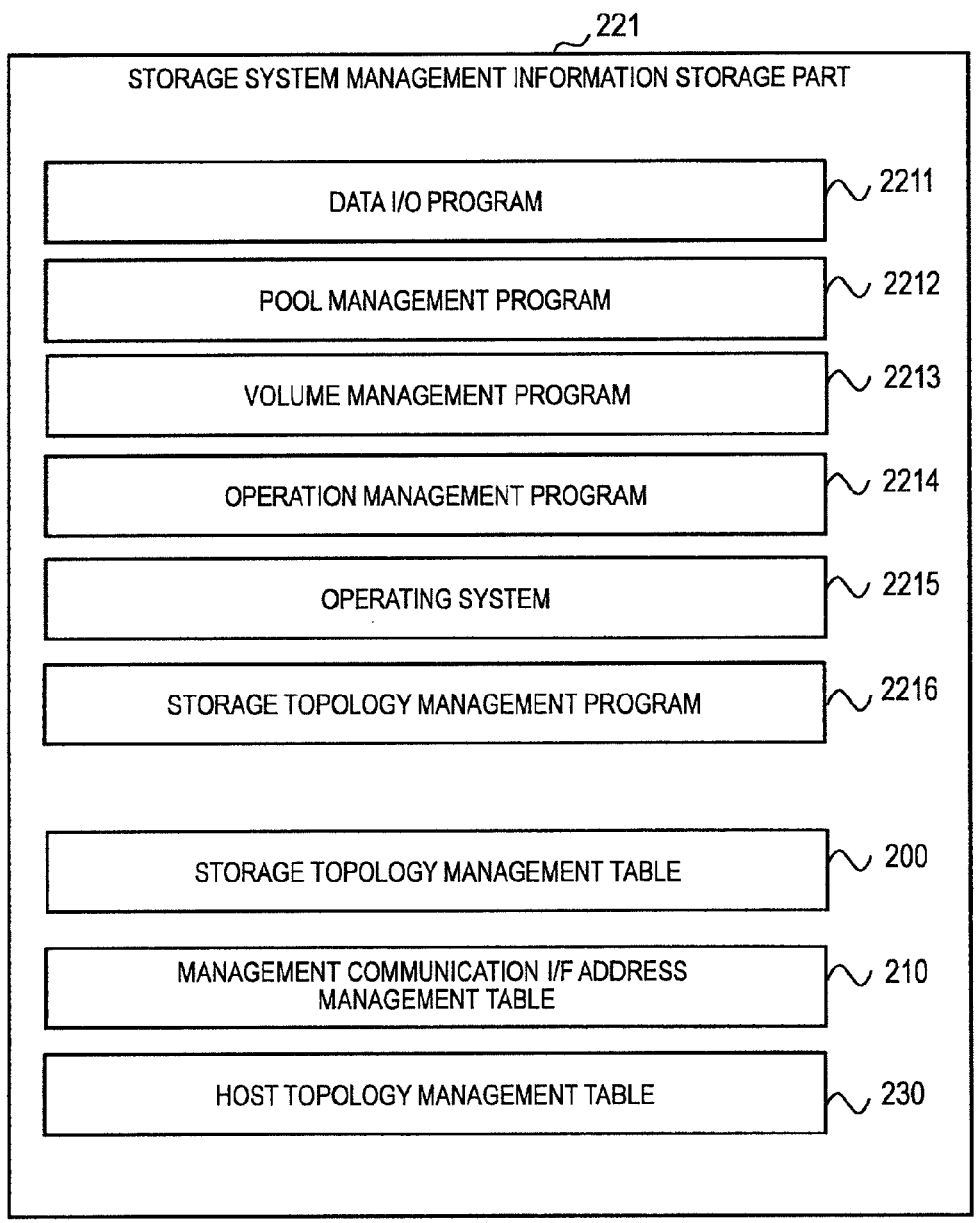
FIG. 31 is a drawing exemplifying information stored in a management information storage part in a storage system in the third embodiment.

FIG. 31 illustrates information held in the storage system management information storage part 221. The point differing from the first embodiment is that a host topology management table 230 is added. The host topology management table 230 is a table for managing information on the paths between the ports of the own storage system 2 and the ports of the host computers 3.

The networks including the paths managed by the storage topology management table 200 and the host topology management table 230 are the same one, which is a network for data communication among the host computers 3 and the storage systems 2, and is typically a SAN. The storage topology management table 200 manages the paths between the ports of the storage systems 2 and the host topology management table 230 manages the paths between the ports of the host computers 3 and the storage system 2.

FIG. 32 illustrates a configuration example of the columns of the host topology management table 230. The host topology management table 230 has columns of port IDs 2301, opposed host computer IDs 2302, opposed port IDs 2303, minimum bandwidths 2304, the number of transit connection apparatuses 2305, average bandwidth usage rates of lowest-bandwidth path 2306, peak bandwidth usage rates of lowest-bandwidth path 2307, and latencies 2308.

The configuration of the host topology management table 230 is substantially the same as the one of the storage topology management table 200; the opposed ports connected from the ports of the storage system 2 are the ports of the host computers 3 instead of the ports of the storage systems 2. The meanings of the values in the other columns are the same as explained in the storage topology management table 200.

The method for the storage system 2 to obtain the information to be stored in the host topology management table 230 is the same as that for the storage topology management table 200. Each connection apparatus 40 in the connection apparatus group 4 has entries, in its connection apparatus management table 400, holding the host computer IDs and their port IDs in the IDs of the apparatuses opposed to its own ports and the connected ports. The connection apparatus 40 transmits required information obtained from the connection apparatus management table 400 in response to a request from the storage system 2.

Now with reference to the flowchart of FIG. 33, a method of determining a recommendation level of a location of a virtual machine (a port of a host computer 3) will be explained. The determination of a location of a virtual machine is made, for example, to transfer a virtual machine in operation from a current host computer 3 to a different host computer 3 or to install a new virtual machine in a host computer 3.

For example, the operation management program 124 of the management computer 1 or the administrator determines a high-loaded host computer 3 with reference to the condition of use of the host computers 3 in the host management table 190 and selects a virtual machine to be transferred to a different host computer 3 from the virtual machines running on the host computer 3. In determining the location of the virtual machine, the port of the volume to be referenced is predetermined. For example, it is the port of the volume being accessed by the virtual machine in operation or the port of the volume holding the OS of the virtual machine.

The operation management program 124 or the administrator selects the ports of the host computers 3 which can be connected from the port of the volume as the candidate ports for location with reference to the transfer range management table 130. The transfer range management table 130 includes information defining the ports of the host computers 3 connectable from each port of the storage systems 2 in addition to the information shown in FIG. 10.

The operation management program 124 or the administrator may refer to the performance and conditions of use of the host computers 3 in the host management table 190 in selecting the candidate ports for location. The ports of the host computers 3 whose values fall in the predetermined ranges are selected as the candidate locations. The operation management program 124 executes the flow of FIG. 33 for each of the selected candidate location ports.

First, the operation management program 124 of the management computer 1 sets the recommendation level item count at the number of items (S601). The number of items in this example is 5. The operation management program 124 executes steps S603 to S613 for the path between the selected port of a host computer 3 and the port of the volume.

The steps S603 to S613 are the same as the steps S203 to S213 in the flowchart of FIG. 23 in the first embodiment. Although the first embodiment calculates a recommendation level of the volume location port for the path between ports of storage systems 2, the management computer 1 in the third embodiment calculates a recommendation level of a candidate virtual machine location port for the path between the port of the host computer 3 and the port of the storage system 2.

The operation management program 124 selects a candidate virtual machine location port and obtains information on the path between the host port and the storage system port of the volume from the storage system 2 the volume belonging to (S602). The storage system 2 transmits information on the entry determined by the storage system port and the host post in the host topology management table 230 to the management computer 1.

The operation management program 124 executes the steps S603 to S613 for (the path determined by) the candidate port for location with reference to the path information obtained from the storage system 2. The operation management program 124 stores the calculated recommendation level in the virtual machine location recommendation level table 197. The location recommendation level table 197 includes columns of host computer IDs, port IDs, and recommendation levels of location, for example.

The operation management program 124 obtains the values of the identifiers of the candidate host computers 3 and ports for location and their recommendation levels from the location recommendation level table 197 and outputs them to the image output apparatus 18. The administrator can determine the virtual machine location port with reference to the displayed values of the recommendation level. Like in the first embodiment, the management computer 1 may automatically determine the port to locate the virtual machine based on the calculated priority levels (recommendation levels in this example).

Next, with reference to FIG. 34, an example of calculating a recommendation level of a connection port of a volume in the virtual machine whose connection port in the host computer 3 has been determined will be explained. This example does not transfer a volume from the current storage system 2 to a different storage system 2, but calculates recommendation levels of the plurality of ports in the same storage system 2.

Since different ports in a storage system 2 are connected to a port of a host computer 3 with different paths, their respective path configurations (including connection apparatus configurations and bandwidths) may differ from one another. Accordingly, selection of an appropriate port in the storage system 2 leads to selection of a port that can show good transfer performance to the port of the host computer 3.

Figure 33:
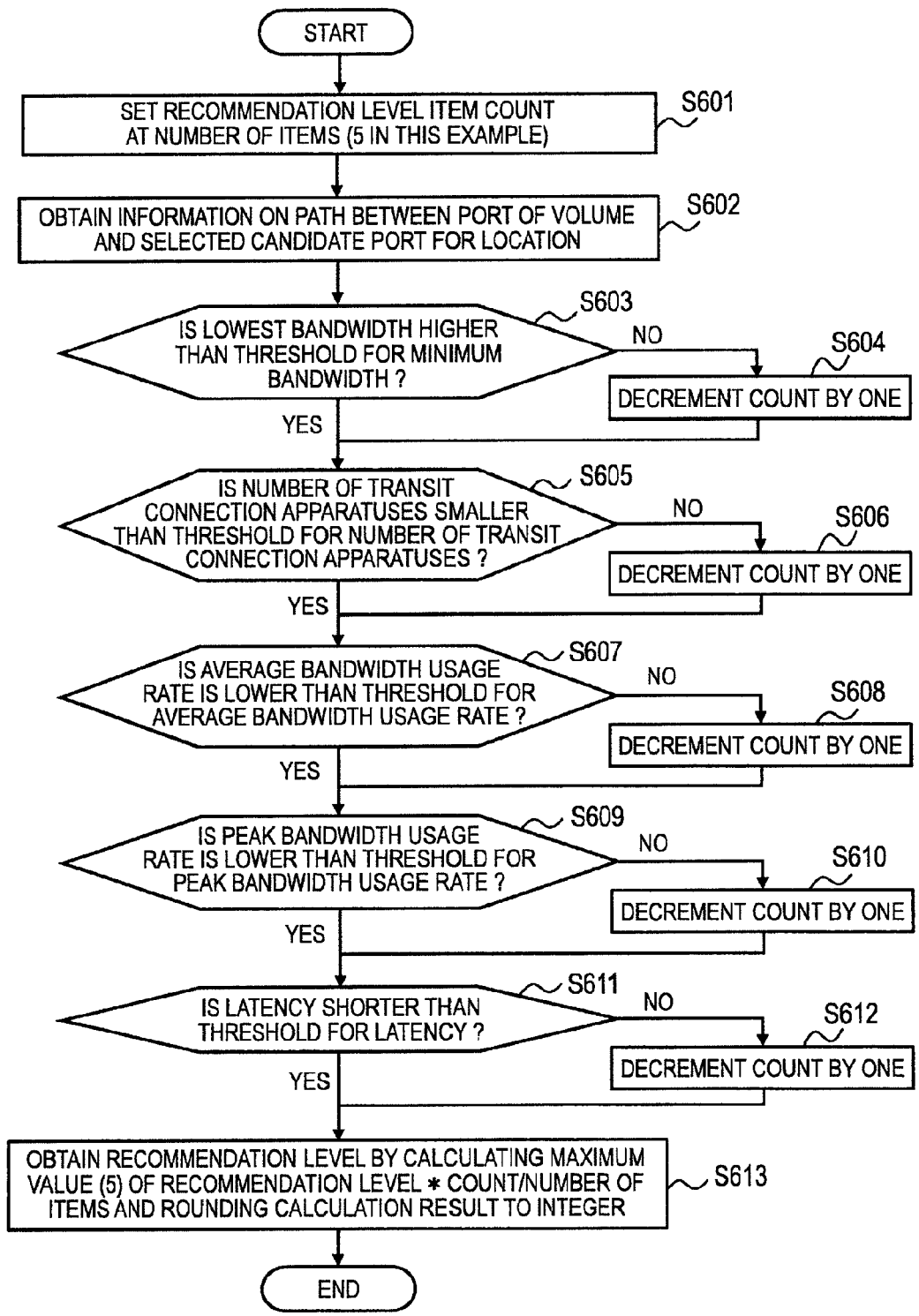
FIG. 33 is a flowchart illustrating an example of a method of calculating a recommendation level of a candidate virtual machine location port in the third embodiment.
Figure 34:
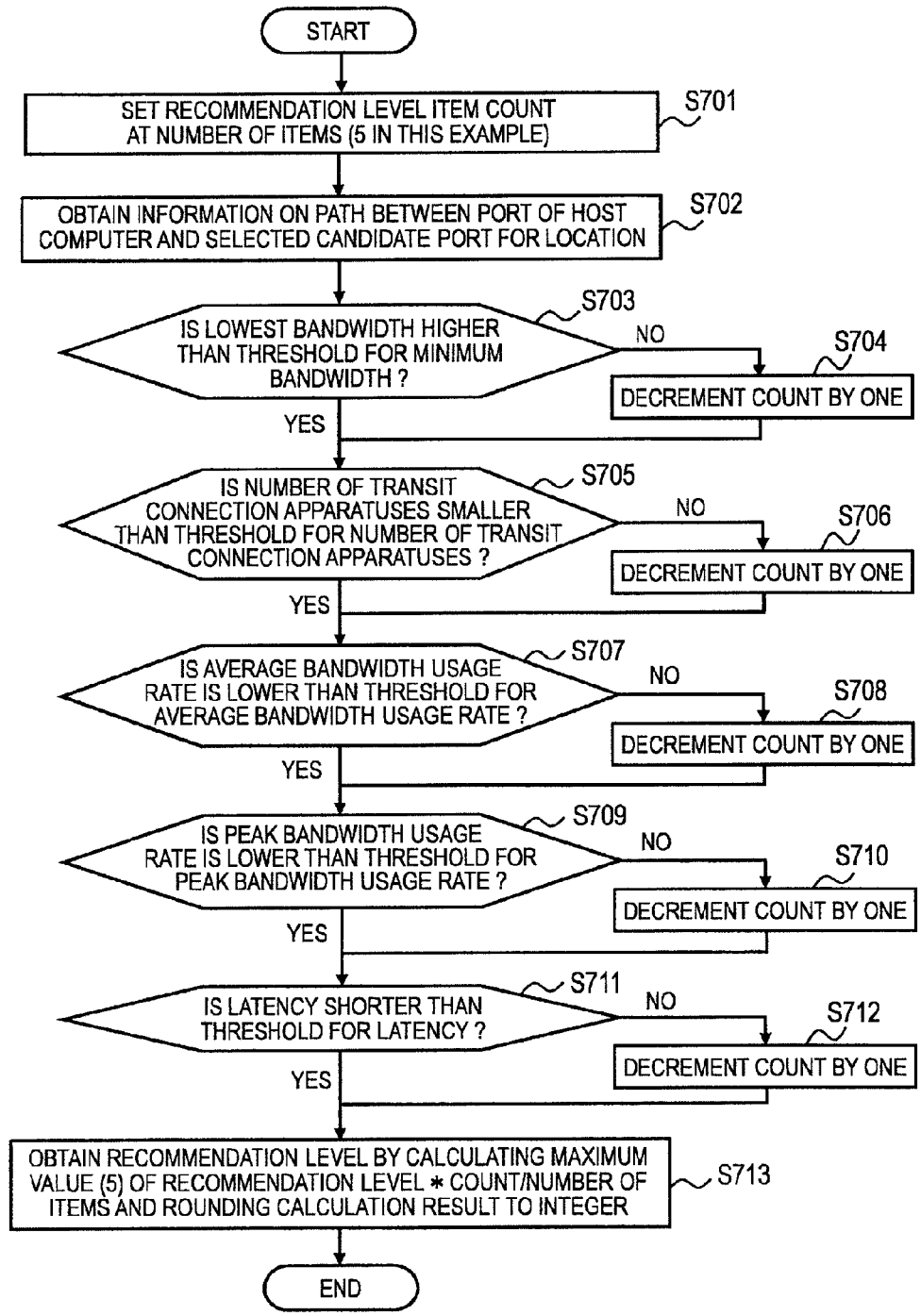
FIG. 34 is a flowchart illustrating an example of a method of calculating a recommendation level of a candidate connection port of a volume in the third embodiment.

In the flowchart of FIG. 34, the steps S701 and S703 to S713 are the same as the steps S601, S603 to S613 in the flowchart of FIG. 33. Like the flow of FIG. 33, the operation management program 124 of the management computer 1 calculates recommendation levels of the paths between the host computer 3 and the storage system 2.

At step S702, the operation management program 124 selects one of the ports of the storage system 2 at which volumes exist. The operation management program 124 sequentially selects the ports of the storage system 2 at which volumes exist one by one to execute the steps S703 to S713.

The operation management program 124 stores a port of the storage system and the calculated recommendation level thereof in the recommendation level table (not shown) and presents them to the administrator. This is the same as in the other flows of calculation of recommendation level. Like in the other processing, the management computer may automatically determine the connection port of the volume without presenting the recommendation level.

In this example, an example of calculating recommendation level of ports in a single storage system 2 has been explained, but the management computer 1 may calculate the recommendation levels of the storage system ports to which volumes are connected, including the ports of the other storage systems 2. Although the first embodiment calculates recommendation levels of the ports for the paths between storage system ports, the third embodiment calculates recommendation levels of the connection ports of volumes based on the paths between a port of a host computer 3 and ports of a storage system 2.

As set forth above, this invention has been described in detail with reference to the accompanying drawings. However, this invention is not limited to the specific configurations but includes various modifications and equivalent configurations within the scope of the appended claims. A part of the configurations in this embodiment may be added, deleted, or replaced with those in the other configurations. It is preferable that the system include all of the above-described functions, but the system may include only a part of the functions.

The above-described configurations and functions, for all or a part of them, may be implemented by hardware obtained by designing integrated circuits, for example. The information of programs, tables, and files to implement the functions may be stored in a storage device such as a non-volatile semiconductor memory, a hard disk drive, or an SSD, or a computer-readable non-transitory data storage medium such as an IC card, an SD card, or a DVD.

The invention claimed is:

1. A computer system comprising:
a plurality of host computers in which a plurality of host programs are executed;
a plurality of storage systems including a plurality of volumes provided to the plurality of host programs;
a plurality of storage systems including a plurality of resource pools provided by storage areas on the plurality of storage systems; and
a management system, wherein:
each of the plurality of host programs is located at a port of a host computer;
each of the plurality of volumes is located at one of a plurality of ports of a plurality of storage systems;
the plurality of volumes include a first volume located at a first port of a first storage system;
a range of a resource pool is managed as a transfer range;
the management system is configured to:
specify a plurality of candidate ports for new location of the first volume in the plurality of storage systems,
specify the plurality of candidate ports from the ports which belong to the same resource pool managed as a transfer range with the first volume and belong to the storage system having a free capacity more than a capacity of the first volume, and
obtain information on bandwidths of a plurality of paths included in a data communication network among the plurality of storage systems and the plurality of host computers including information on bandwidths of individual paths between the first port and the candidate ports for new location of the first volume in the plurality of storage systems;
the management system further obtains information on the number of connection apparatuses in the individual paths between the first port and the candidate ports for new location and access status of the first volume;
the management system determines priority levels of the individual candidate ports with reference to the information on the bandwidths of the individual paths between the first port and the candidate ports for new location and the number of connection apparatuses in the individual paths between the first port and the candidate ports for new location and the access status of the first volume; and
the management system presents the determined priority levels.

2. The computer system according to claim 1, wherein the management system displays the candidate ports for new location and the priority levels.

3. The computer system according to claim 1, wherein:
the information includes information on minimum bandwidths of the individual paths between the first port and the candidate ports for new location; and
the management system determines the priority levels of the individual candidate ports for new location with reference to the minimum bandwidths of the individual paths between the first port and the candidate ports for new location.

4. The computer system according to claim 3, wherein:
the management system further obtains information on usages of lowest-bandwidth paths in the individual paths between the first port and the candidate ports for new location; and
the management system determines the priority levels of the individual candidate ports for new location with reference to the usages of lowest bandwidth paths in the individual paths between the first port and the candidate ports for new location.

5. The computer system according to claim 3, wherein:
the management system further obtains information on the amount of I/O at the first port for the first volume; and
the management system determines the priority levels of the individual candidate ports for new location with reference to the information on the amount of I/O.

6. The computer system according to claim 1, wherein:
the plurality of volumes include a second volume for a first host program located at a second port of a second storage system;
the information includes information on bandwidths of individual paths between the second port and the candidate ports for new location of the first host program; and
the management system determines the priority levels of the individual candidate ports for new location of the first host program with reference to the information on the bandwidths of the individual paths between the second port and the candidate ports for new location of the first host program.

7. The computer system according to claim 1, wherein:
the plurality of volumes include a second volume for a first host program;
the first host program is located at a second port;
the information includes information on bandwidths of individual paths between the second port and candidate ports for new location of the second volume; and
the management system determines the priority levels of the individual candidate ports for new location of the second volume with reference to the information on the bandwidths of the individual paths between the second port and the candidate ports for new location of the second volume.

8. The computer system according to claim 1,
wherein, when the first volume is a thin provisioning volume, a port belonging to the thin provisioning pool associated with the first volume is selected, and the selected port has a free capacity that is more than a capacity of the first volume.

9. A management system for managing a computer system including a plurality of host computers in which a plurality of host programs are executed and a plurality of storage systems including a plurality of volumes provided to the plurality of host programs, the management system comprising:
a processor; and
a storage apparatus, wherein:
each of the plurality of host programs is located at a port of a host computer;
each of the plurality of volumes is located at one of a plurality of ports of the plurality of storage systems;
each of the plurality of paths is a path between a port of the plurality of storage systems and another port of the plurality of host computers or the plurality of storage systems;
the plurality of volumes include a first volume located at a first port of a first storage system;
the plurality of storage systems includes a plurality of resource pools provided by storage areas on the plurality of storage systems;
a range of a resource pool is managed by a transfer range;
the management system is configured to:
specify a plurality of candidate ports for new location of the first volume in the plurality of storage systems;
specify the plurality of candidate ports from the ports which belongs to the same pool with the first volume and belongs to the storage system having a free capacity more than a capacity of the first volume; and
obtain information on bandwidths of a plurality of paths included in a data communication network among the plurality of storage systems and the plurality of host computers including information on bandwidths of individual paths between the first port and the candidate ports for new location of the first volume in the plurality of storage systems;
the processor further obtains information on the number of connection apparatuses in the individual paths between the first port and the candidate ports for new location and access status of the first volume; and
the processor determines priority levels of the individual candidate ports for new location with reference to the information on the bandwidths of the individual paths between the first port and the candidate ports for new location and the number of connection apparatuses in the individual paths between the first port and the candidate ports for new location and the access status of the first volume
the processor presents the determined priority levels to an administrator.

10. The management system according to claim 9, further comprising an image output apparatus for outputting an image including the candidate ports for new location and the priority levels.

11. The management system according to claim 9, wherein:
the information includes information on minimum bandwidths of the individual paths between the first port and the candidate ports for new location; and the processor determines the priority levels of the individual candidate ports for new location with reference to the minimum bandwidths of the individual paths between the first port and the candidate ports for new location.

12. The management system according to claim 11, wherein:
the processor further obtains information on usages of lowest bandwidth paths in the individual paths between the first port and the candidate ports for new location and stores the information in the storage apparatus; and
the processor determines the priority levels of the individual candidate ports for new location with reference to the usages of lowest-bandwidth paths in the individual paths between the first port and the candidate ports for new location.

13. The management system according to claim 11, wherein:
the processor further obtains information on the amount of I/O at the first port for the first volume and stores the information in the storage apparatus; and
the processor determines the priority levels of the individual candidate ports for new location with reference to the information on the amount of I/O.

14. The management system according to claim 9, wherein:
- the plurality of volumes include a second volume for a first host program located at a second port of a second storage system;
- the information includes information on bandwidths of individual paths between the second port and the candidate ports for new location of the first host program; and
- the processor determines the priority levels of the individual candidate ports for new location of the first host program with reference to the information on the bandwidths of the individual paths between the second port and the candidate ports for new location of the first host program.

15. The management system according to claim 9, wherein:
- the plurality of volumes include a second volume for a first host program;
- the first host program is located at a second port;
- the information includes information on bandwidths of individual paths between the second port and candidate ports for new location of the second volume; and
- the processor determines the priority levels of the individual candidate ports for new location of the second volume with reference to the information on the bandwidths of the individual paths between the second port and the candidate ports for new location of the second volume.

16. A computer system comprising:
- a plurality of host computers in at least one of which a virtual machine is to be executed
- a plurality of storage systems providing a plurality of volumes to at least one of the host computers;
- a plurality of storage systems including a plurality of resource pools provided by storage areas on the plurality of storage systems; and
- a management system; wherein:
- one of the plurality of volumes located in a first port in the storage system having a host program to be used by the virtual machine;
- the management system determines priority level of individual candidate ports for location of the virtual machine with reference to the information;
- wherein the information includes:
- bandwidths and a number of connection apparatuses of individual paths between the first port and the candidate ports;
- a range of a resource pool is managed as a transfer range;
- the management system is configured to:
  - specify a plurality of candidate ports for new location of the one volume in the storage system,
  - specify the plurality of candidate ports from the ports which belong to the same resource pool managed as a transfer range with the first volume and belong to the storage system having a free capacity more than a capacity of the first volume, and
  - obtain information on bandwidths of a plurality of paths included in a data communication network among the plurality of storage systems and the host computer including information on bandwidths of individual paths between the first port and the candidate ports for new location of the one volume in the storage system;
- the management system further obtains information on the number of connection apparatuses in the individual paths between the first port and the candidate ports for new location and access status of the one volume; and
- the management system determines priority levels of the individual candidate ports with reference to the information on the bandwidth of the individual paths between the first port and the candidate ports for new location and the number of connection apparatuses in the individual paths between the first port and the candidate ports for new location and the access status of the one volume; and
- the management system presents the determined priority levels.

* * * * *